(12) United States Patent
Funayama et al.

(10) Patent No.: US 7,809,166 B2
(45) Date of Patent: Oct. 5, 2010

(54) IMAGE PROCESSING APPARATUS FOR ESTIMATING MOTION OF PREDETERMINED FEATURE POINT OF 3D OBJECT

(75) Inventors: Ryuji Funayama, Tokyo (JP); Mun-Ho Jeong, Urayasu (JP); Masamichi Osugi, Funabashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 654 days.

(21) Appl. No.: 10/563,957

(22) PCT Filed: Jul. 9, 2004

(86) PCT No.: PCT/JP2004/010171

§ 371 (c)(1),
(2), (4) Date: Jul. 12, 2006

(87) PCT Pub. No.: WO2005/006251

PCT Pub. Date: Jan. 20, 2005

(65) Prior Publication Data

US 2007/0052698 A1    Mar. 8, 2007

(30) Foreign Application Priority Data

Jul. 11, 2003  (JP)  ............................ 2003-273590
Apr. 6, 2004   (JP)  ............................ 2004-112423

(51) Int. Cl.
*G06K 9/00* (2006.01)
(52) U.S. Cl. .................................................... 382/107
(58) Field of Classification Search ................ 382/100, 382/107, 115–118, 190, 209; 348/77, 78, 348/143, 169–172; 345/619–928
See application file for complete search history.

(56) References Cited

U.S. PATENT DOCUMENTS 6,580,821 B1 *  6/2003  Roy ........................... 382/154

FOREIGN PATENT DOCUMENTS

| JP | 08-297019 | 11/1996 |
| JP | 11-281323 | 10/1999 |
| JP | 11-281324 | 10/1999 |

OTHER PUBLICATIONS

Heinzmann, J. et al., "3-D Facial Pose and Gaze Point Estimation using a Robust Real-Time Tracking Paradigm," *IEEE* (1998), pp. 142-147.

Essa A. et al., "Coding, Analysis, Interpretation, and Recognition of Facial Expressions," *IEEE Trans. PAMI*, vol. 19, No. 17, (Jul. 7, 1997), pp. 757-763.

De la Torre, F. et al., "Eigenfiltering for Flexible Eigintracking (EFE)," *Proc. Intl. Conf. on Pattern Recognition*, 2000 IEEE, pp. 1118-1121.

(Continued)

*Primary Examiner*—Samir A. Ahmed
*Assistant Examiner*—Atiba O. Fitzpatrick
(74) *Attorney, Agent, or Firm*—Finnegan, Henderson, Farabow, Garrett & Dunner, LLP

(57) ABSTRACT

An image processing apparatus is an apparatus for determining a gaze from a motion picture of a face taken by a monocular camera, and is configured to define a 3D structure of a center of a pupil on the facial picture by a static parameter and a dynamic parameter, and to determine the gaze by estimating the static parameter and the dynamic parameter. Another image processing apparatus is an apparatus for determining a motion of a 3D object from a motion picture thereof taken by a monocular camera, and is configured to define a 3D structure of the 3D object on the picture by a rigid parameter and a non-rigid parameter, and to determine the motion of the 3D object by estimating the rigid parameter and the non-rigid parameter.

17 Claims, 17 Drawing Sheets

OTHER PUBLICATIONS

Cootes, T. F. et al., "Active Appearance Models," *Eur. Conf. on Computer Vision* 1998, vol. 2, pp. 484-498.

Azarbayejani, A. et al., "Recursive Estimation of Motion, Structure, and Focal Length," *IEEE Trans. PAMI*, vol. 17, No. 6, (Jun. 1995), pp. 562-575.

Miyakawa, M. et al., "A Method for Real-Time Detection of Gazing Point Developed for Multi-Modal Interface," *Inst. Electronics, Information and Communication Engrs.*, Dec. 2000, vol. J83 D-2, No. 12, pp. 2810-2821, Abstract.

International Search Report dated Aug. 31, 2004.

Jebara, T., et al., "3D Structure from 2D Motion," *IEEE Signal Processing Magazine*, vol. 16, No. 3, May 1999, pp. 66-84.

Zhang, L., "Tracking a face for knowledge-based coding of videophone sequences," *Signal Processing Image Communication*, vol. 10, No. 1-3, Jul. 1997, pp. 93-114.

Park, K. R., et al., "Gaze position detection by computing the three dimensional facial positions and motions," *Pattern Recognition*, vol. 35, No. 11, Nov. 2002, pp. 2559-2569.

Ji, Qiang, "3D Face pose estimation and tracking from a monocular camera," *Image and Vision Computing*, vol. 20, No. 7, May 1, 2002, pp. 499-511.

Supplementary European Search Report dated Jun. 19, 2007.

* cited by examiner

IMAGE PROCESSING APPARATUS FOR ESTIMATING MOTION OF PREDETERMINED FEATURE POINT OF 3D OBJECT

TECHNICAL FIELD

The present invention relates to an image processing apparatus and image processing method for performing image processing on a motion picture of a 3D object taken by a monocular camera and, more particularly, to an image processing apparatus and image processing method for estimating a motion of a 3D object from a motion picture of the 3D object. The present invention also relates to an image processing program for letting a computer execute the image processing method, and a computer-readable recording medium storing the image processing program.

BACKGROUND ART

There are a variety of image processing methods for detecting a local motion of a 3D object. For example, there are image processing methods of handling a face being a 3D object, as a target and detecting a pose of the face itself, a motion of each part of the face, etc. from a motion picture of the face taken by a camera. Such image processing methods include those of detecting a gaze of eyes (cf. Non-patent Document 1: J. Heinzmann and A. Zelinsky, "3-D facial pose and gaze point estimation using a robust real-time tracking paradigm," IEEE Int. Workshop on Automatic Face and Gesture Recognition, pp 142-147, 1998). Non-patent Document 1 describes a method of taking a picture of a face with a monocular camera and determining the gaze while tracking the face from the motion picture thereof The method described in Non-patent Document 1 is to find a number of feature points of the face by Kalman filtering and to obtain the facial pose and gaze using the found feature points.

DISCLOSURE OF THE INVENTION

The foregoing method of obtaining the gaze is not to directly filter parameters of the facial pose and gaze, but to filter only the feature points, and it thus fails to perform an optimal estimation of the gaze. In this method, the gaze is estimated using a relative position change between feature points of both ends of an eye and the center point of the pupil. Therefore, the estimation depends upon the specific feature points (i.e., the feature points of the both ends of the eye) and there is a limitation to the estimation of gaze. Furthermore, the gaze is estimated using the relative position change between the feature points of the both ends of the eye and the center point of the pupil, and this method is premised on the Affine Transformation of the camera model. For this reason, this method does not hold under the general Perspective Transformation and thus has a restricted range of application.

In the case of the face, there are various changes in facial expression and each part of the face, such as lips, moves according to the facial expression. For this reason, it is very difficult to determine a motion of each part of the face in relation to the facial pose. Furthermore, objects performing such motion are not limited only to the face, but various 3D objects, such as the heart, also perform such motion.

An object of the present invention is therefore to provide an image processing apparatus and image processing method capable of determining a local motion of each part of a 3D object with a high degree of accuracy, while dealing with a total motion of the 3D object. Another object of the present invention is to provide an image processing program for letting a computer execute the image processing method, and a computer-readable recording medium storing the image processing program.

An image processing apparatus according to an aspect of the present invention is an image processing apparatus for estimating a motion of a predetermined feature point of a 3D object from a motion picture of the 3D object taken by a monocular camera. This image processing apparatus comprises observation vector extracting means from each of frames of the motion picture, 3D model initializing means, and motion estimating means.

The observation vector extracting means extracts projected coordinates of the predetermined feature point on an image plane. The 3D model initializing means makes the observation vector extracting means extract initial projected coordinates from an initial frame of the motion picture. The 3D model initializing means makes the observation vector extracting means extract the initial projected coordinates in a model coordinate arithmetic expression for calculation of model coordinates of the predetermined feature point, based on a first parameter, a second parameter, and the initial projected coordinates, from the initial frame of the motion picture. Here the model coordinate arithmetic expression is based on back projection of the monocular camera, the first parameter is a parameter independent of a local motion of a portion including the predetermined feature point, and the second parameter is a parameter dependent on the local motion of the portion including the predetermined feature point.

The motion estimating means calculates estimates of state variables including the first parameter, the second parameter, and a third parameter, and outputs an output value concerning a motion of the predetermined feature point on the basis of the second parameter included in the estimates of the state variables. Here the third parameter is a parameter in a motion arithmetic expression for calculation of coordinates of the predetermined feature point at a time of photography when a processing target frame of the motion picture different from the initial frame was taken, from the model coordinates based on a motion model of the 3D object.

The motion estimating means calculates predicted values of the state variables at the time of photography when the processing target frame was taken, based on a state transition model. The motion estimating means applies the initial projected coordinates, and the first parameter and the second parameter included in the predicted values of the state variables, to the model coordinate arithmetic expression, thereby calculating estimates of the model coordinates. The motion estimating means applies the third parameter included in the estimates of the state variables, and the estimates of the model coordinates to the motion arithmetic expression, thereby calculating estimates of coordinates of the predetermined feature point at the time of photography. The motion estimating means applies the estimates of the coordinates of the predetermined feature point to an observation function based on an observation model of the monocular camera, thereby calculating estimates of an observation vector of the predetermined feature point. The motion estimating means makes the observation vector extracting means extract projected coordinates of the predetermined feature point from the processing target frame, as the observation vector, and filters the predicted values of the state variables by use of the extracted observation vector and the estimates of the observation vector, thereby calculating the estimates of the state variables at the time of photography.

An image processing method according to another aspect of the present invention is an image processing method of estimating a motion of a predetermined feature point of a 3D object from a motion picture of the 3D object taken by a monocular camera. This image processing method comprises a 3D model initialization step and a motion estimation step.

The 3D model initialization step is to extract from an initial frame of the motion picture, initial projected coordinates in a model coordinate arithmetic expression for calculation of model coordinates of the predetermined feature point on the basis of a first parameter, a second parameter, and the initial projected coordinates. The model coordinate arithmetic expression is based on back projection of the monocular camera, the first parameter is a parameter independent of a local motion of a portion including the predetermined feature point, and the second parameter is a parameter dependent on the local motion of the portion including the predetermined feature point.

The motion estimation step is to calculate estimates of state variables including the first parameter, the second parameter, and a third parameter and to output an output value concerning a motion of the predetermined feature point on the basis of the second parameter included in the estimates of the state variables. Here the third parameter is a parameter in a motion arithmetic expression for calculation of coordinates of the predetermined feature point at a time of photography when a processing target frame of the motion picture different from the initial frame was taken, from the model coordinates on the basis of a motion model of the 3D object.

The motion estimation step comprises calculating predicted values of the state variables at the time of photography when the processing target frame was taken, based on a state transition model. The motion estimating means applies the initial projected coordinates, and the first parameter and the second parameter included in the predicted values of the state variables, to the model coordinate arithmetic expression, thereby calculating estimates of the model coordinates. The motion estimation step comprises applying the third parameter included in the predicted values of the state variables, and the estimates of the model coordinates to the motion arithmetic expression, thereby calculating estimates of coordinates of the predetermined feature point at the time of photography. The motion estimation step comprises applying the estimates of the coordinates of the predetermined feature point to an observation function based on an observation model of the monocular camera, thereby calculating estimates of an observation vector of the predetermined feature point. The motion estimation step comprises extracting projected coordinates of the predetermined feature point from the processing target frame, as the observation vector and filtering the predicted values of the state variables by use of the extracted observation vector and the estimates of the observation vector, thereby calculating estimates of the state variables at the time of photography.

An image processing program according to another aspect of the present invention is a program for letting a computer execute the image processing method of the present invention described above. A recording medium according to still another aspect of the present invention is a computer-readable recording medium and stores the image processing program of the present invention described above.

According to the present invention described above, the state variables include the parameters for calculation of the model coordinates of the predetermined feature point, which are separated into the first parameter independent of the local motion and the second parameter dependent on the local motion. Therefore, the first parameter to converge at a specific value is separated from the second parameter varying with the local motion, whereby the model coordinates can be estimated accurately. The coordinates of the predetermined feature point after the overall motion of the 3D object are estimated from the model coordinates, using the third parameter for calculation of the overall motion of the 3D object. Therefore, the coordinates after the motion can be calculated, while dealing with the overall motion of the 3D object. Furthermore, the predicted values of the state variables are filtered using the estimates of the observation vector calculated from the estimated coordinates of the predetermined feature point and using the observation vector actually measured, whereby the parameters for estimation of the motion of the predetermined feature point can be directly filtered, so that the estimates of the state variables including these parameters can be accurately estimated. Therefore, the present invention permits accurate calculation of the output value about the motion of the predetermined feature point on the basis of the second parameter.

In the present invention described above, the first parameter can be a static parameter to converge at a specific value, and the second parameter can be a dynamic parameter to vary with the motion of the portion including the predetermined feature point. The static parameter is preferably a depth from the image plane to the predetermined feature point, and the dynamic parameter is preferably a rotation parameter for specifying a rotational motion of the portion including the predetermined feature point. In this case, the rotation parameter can be angles made by a vector from an origin to the predetermined feature point with respect to two coordinate axes in a coordinate system having the origin at a center of the portion including the predetermined feature point.

In the present invention described above, the first parameter can be a rigid parameter, and the second parameter a non-rigid parameter. The rigid parameter is preferably a depth from the image plane to the model coordinates, and the non-rigid parameter is preferably a change amount about a position change of the predetermined feature point due to the motion of the portion including the predetermined feature point.

In the above-described present invention, the motion model may be a model based on rotation and translation motions of the 3D object and, in this case, the third parameter can be a translation parameter for specifying a translation amount of the 3D object and a rotation parameter for specifying a rotation amount of the 3D object.

In the above-described present invention, it is preferable to apply extended Kalman filtering as the filtering.

An image processing apparatus according to the present invention is an image processing apparatus for taking a picture of a face with a monocular camera and obtaining a gaze from the motion picture thus taken, wherein a 3D structure of a center of a pupil on the facial picture is defined by a static parameter and a dynamic parameter and wherein the gaze is obtained by estimating the static parameter and the dynamic parameter.

In this image processing apparatus, for the motion picture of the face taken by the monocular camera, the 3D structure at the center point of the pupil on the facial picture is defined by the static parameter and the dynamic parameter. Furthermore, the image processing apparatus estimates the static parameter and the dynamic parameter by filtering or the like, and determines the gaze direction from their estimates. In this manner, the image processing apparatus performs the modeling of the pupil motion possibly occurring in practice, using the static parameter and the dynamic parameter, whereby the gaze can be estimated with a high degree of accuracy. This image processing apparatus is able to perform the optimal estimation of the gaze while dealing with the unrestricted motion of the face, with the monocular camera.

An image processing method according to the present invention is an image processing method of taking a picture of a face with a monocular camera and obtaining a gaze from the motion picture thus taken, comprising defining a 3D structure of a center of a pupil on the facial picture by a static parameter and a dynamic parameter, and determining the gaze by estimating the static parameter and the dynamic parameter.

The motion picture consists of temporally consecutive images. The static parameter is a parameter originally having a fixed value, and, for example, a value about an eyeball or a pupil. The dynamic parameter is a parameter having no fixed value and, for example, a value varying with motion of the face or the eyeball.

An image processing program of the present invention is a program for letting a computer execute this image processing method. A recording medium of the present invention is a computer-readable recording medium storing the image processing program.

In the above image processing apparatus, image processing method, image processing program, and recording medium of the present invention, the static parameter is preferably a depth of the pupil in a camera coordinate system. Furthermore, in the above image processing apparatus and the above image processing method of the present invention, the dynamic parameter is preferably a rotation parameter of an eyeball and, particularly, the rotation parameter of the eyeball preferably has two degrees of freedom permitting rotations relative to two coordinate axes in a coordinate system of the eyeball.

An image processing apparatus according to the present invention is an image processing apparatus for taking a picture of a 3D object with a monocular camera and determining a motion of the 3D object from the motion picture thus taken, wherein a 3D structure of the 3D object on the picture is defined by a rigid parameter and a non-rigid parameter and wherein the motion of the 3D object is determined by estimating the rigid parameter and the non-rigid parameter.

In this image processing apparatus, for the motion picture of the 3D object taken by the monocular camera, the 3D structure of the 3D object on the picture is defined by the rigid parameter and the non-rigid parameter. Furthermore, the image processing apparatus estimates the rigid parameter and the non-rigid parameter by filtering or the like and determines the motion of the 3D object from their estimates. In this manner, the image processing apparatus performs modeling of a motion of a feature point of the 3D object possibly occurring in practice, using the rigid parameter and the non-rigid parameter, and it is thus able to estimate the motion of the 3D object accompanied by the non-rigid change, with a high degree of accuracy. This image processing apparatus is also able to perform an optimal estimation of a motion of each portion of the 3D object while dealing with the unlimited motion of the 3D object. For example, where this image processing apparatus is applied to determination of a motion of each part of the face, the apparatus is able to determine the motion of each part (lips or the like) of the face with a change in facial expression, while dealing with the motion due to translation and rotation of the face.

An image processing method according to the present invention is an image processing method of taking a picture of a 3D object with a monocular camera and determining a motion of the 3D object from the motion picture thus taken, comprising defining a 3D structure of the 3D object by a rigid parameter and a non-rigid parameter, and determining the motion of the 3D object by estimating the rigid parameter and the non-rigid parameter.

The 3D object can be one of various 3D objects and, particularly, it can be one of 3D objects the whole of which makes motions of rotation and translation and each part of which has a non-rigid change, e.g., a face or a heart. The rigid parameter is a parameter for representing a rigid structure in the 3D structure of the 3D object. The non-rigid parameter is a parameter for representing a non-rigid change in the 3D structure of the 3D object.

An image processing program of the present invention is a program for letting a computer execute this image processing method. A recording medium of the present invention is a computer-readable recording medium storing the image processing program.

In the above image processing apparatus, image processing method, image processing program, and recording medium of the present invention, the rigid parameter is preferably a depth of a feature point of the 3D object in a model coordinate system. Furthermore, in the above image processing apparatus and image processing method of the present invention, the non-rigid parameter is preferably a change amount of a feature point of the 3D object in a model coordinate system.

Each of the above-described image processing methods has the same operational effect as the aforementioned image processing apparatus.

BEST MODE FOR CARRYING OUT THE INVENTION

Preferred embodiments of the present invention will be described below with reference to the drawings.

The present embodiment is an application of the present invention to an image processing apparatus in an image processing system for performing image processing on a motion picture of a face as a 3D object taken by a monocular camera. The image processing apparatus according to the present embodiment is an apparatus that is constructed on a computer and that can estimate a motion in a face from a motion picture of the face.

The present embodiment includes two modes. The first embodiment mode is an image processing apparatus for estimating a gaze direction of eyes at a time when each frame of a motion picture is taken, as a local motion of each part of a face. The second embodiment mode is an image processing apparatus for estimating a motion of each part (lips or the like) of a face. There are no restrictions on the motion of the face in the present embodiment, and in the first embodiment the gaze estimation is carried out assuming that the gaze direction of the right eye is the same as the gaze direction of the left eye.

First Embodiment Mode

Figure 1:
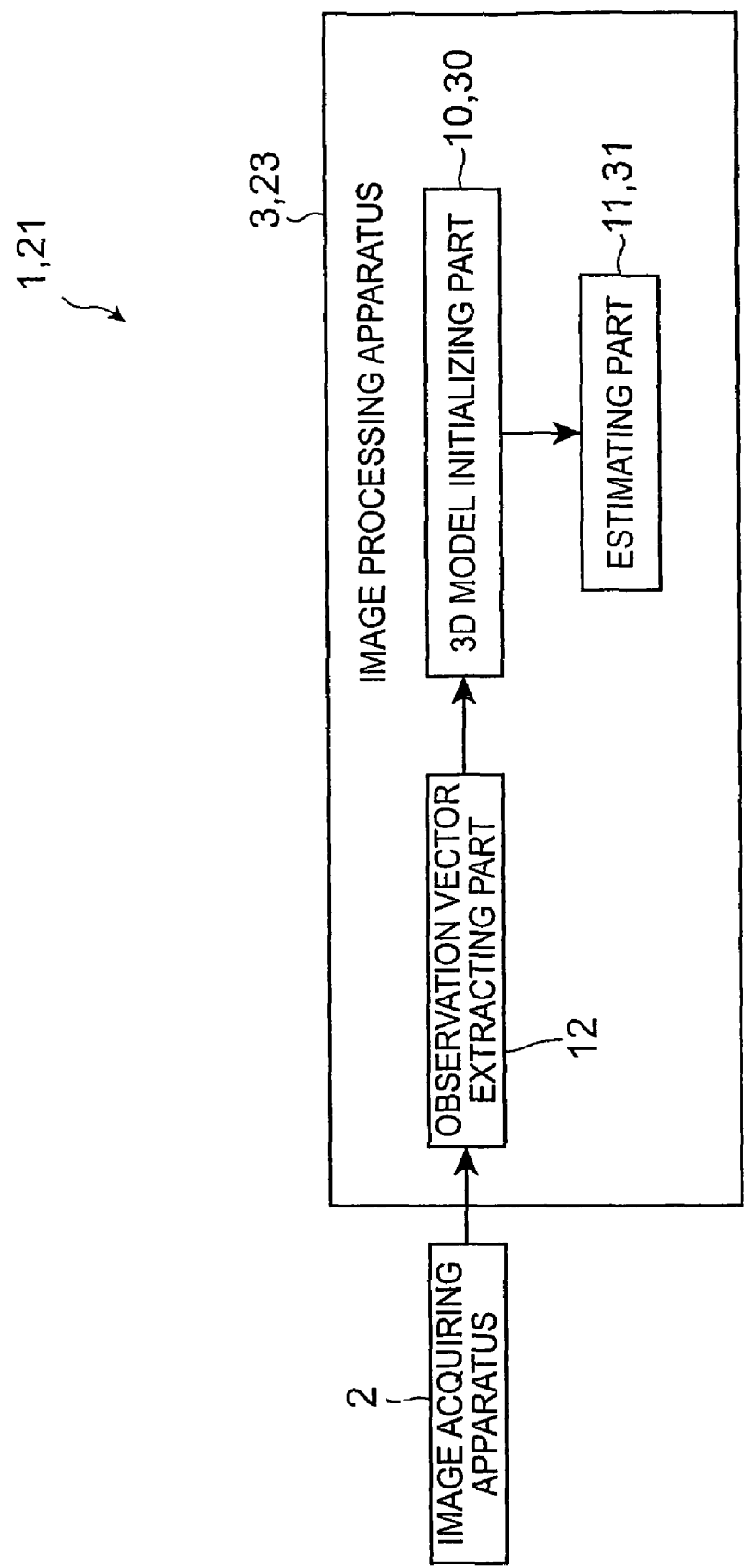
FIG. 1 is an illustration showing a configuration of an image processing system according to an embodiment of the present invention.

The first embodiment mode of the present invention will be described below. FIG. 1 is an illustration showing a configuration of an image processing system according to an embodiment of the present invention.

The image processing system 1 shown in FIG. 1 performs a contactless gaze estimation, using a camera model of the perspective transformation. In the image processing system 1, an image acquiring apparatus 2 is connected to an image processing apparatus 3. The image processing apparatus 3 acquires motion picture data of a face taken by the image acquiring apparatus 2. In the image processing system 1, the image processing apparatus 3 then performs an optimal estimation of the gaze from the motion picture data thus acquired. In the image processing system 1, an output device such as a monitor (not shown) is connected to the image processing apparatus 3 in order to output a process or a result of image processing according to need. The image processing system 1 performs at least the estimation of the gaze, and also performs other image processing on the face, such as an estimation of a pose of the face, according to need.

The image acquiring apparatus 2 is composed of a CCD [Charge Coupled Device] camera (not shown) and a data converter (not shown). The CCD camera is a monocular camera and uses a CCD as an image pickup device. In the CCD camera, light incident through a lens of the camera impinges on the CCD, and the CCD converts information of the light into digital data to be outputted as image data. The CCD camera takes temporally consecutive images of an object to be taken, and outputs data of the temporally consecutive images (motion picture). The data converter converts a format of the motion picture data from the CCD camera into a format that can be handled in the image processing apparatus 3. The image acquiring apparatus 2 takes the picture of the entire face of the subject with the CCD camera, converts the motion picture data into the predetermined format with the data converter, and outputs the data in the predetermined format to the image processing apparatus 3.

Figure 2:
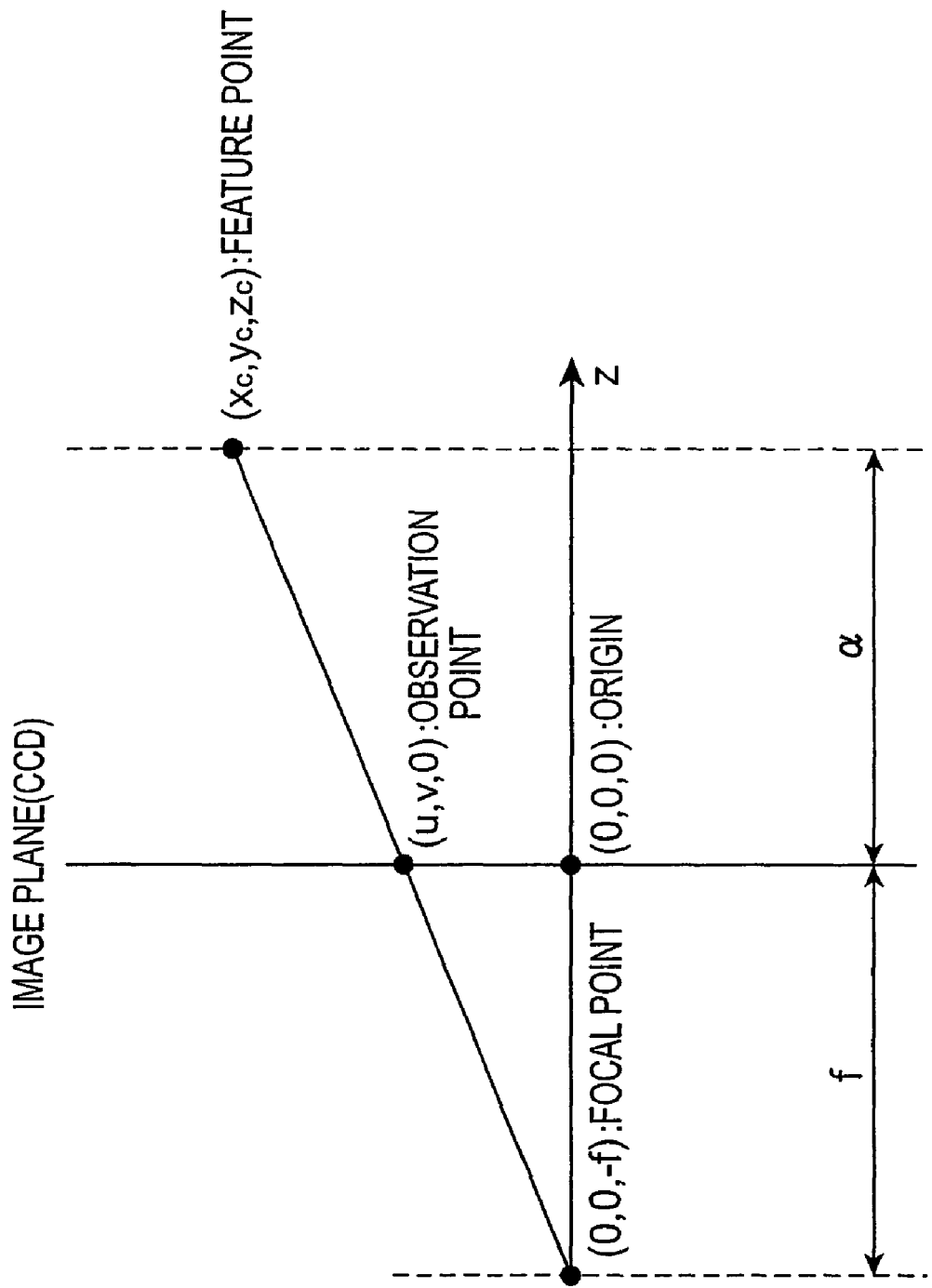
FIG. 2 is a diagram showing a camera coordinate system.
Figure 3:
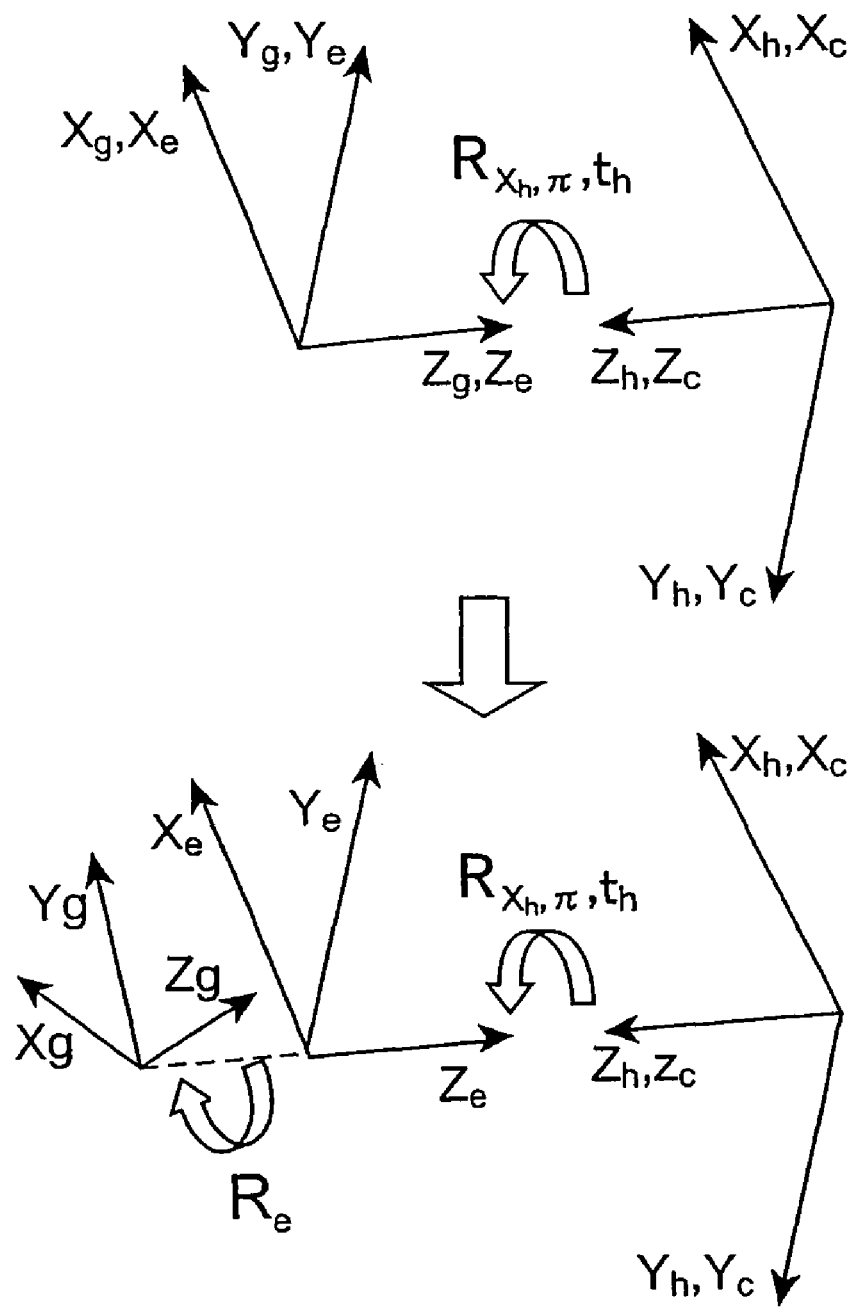
FIG. 3 is an illustration showing the relationship among a camera coordinate system, a face coordinate system, an eyeball coordinate system, and a gaze coordinate system where the face is fixed.
Figure 4:
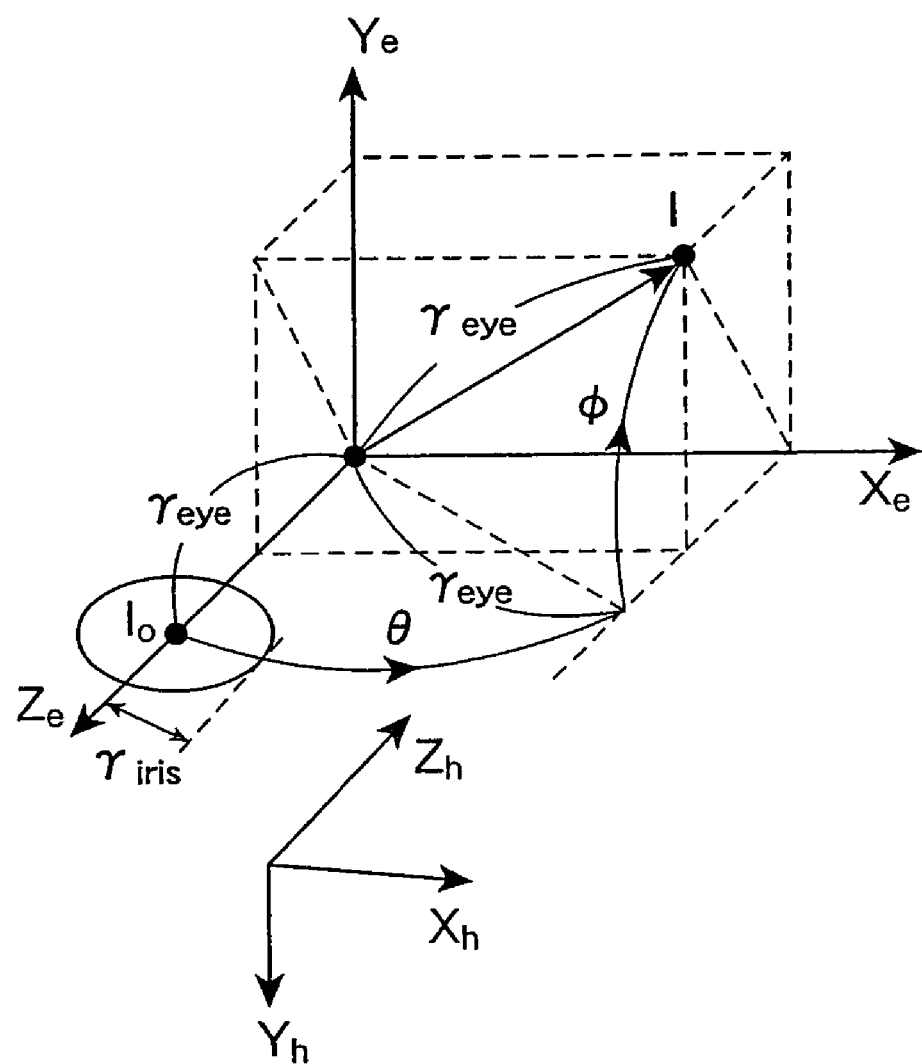
FIG. 4 is an illustration showing an eyeball model.
Figure 5:
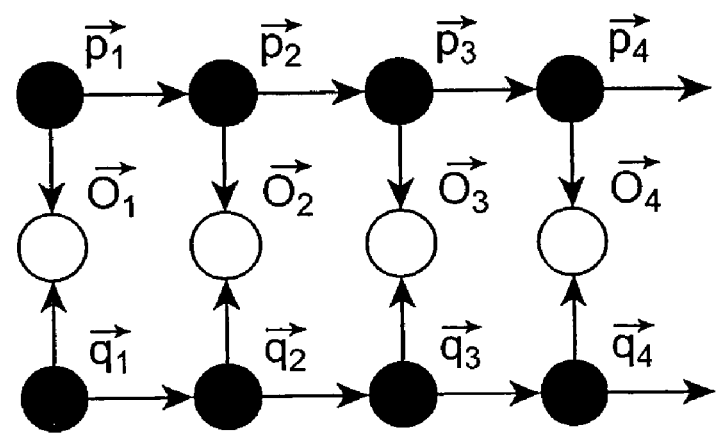
FIG. 5 is an illustration showing a Dynamic Converging-Connected Gaze Model.
Figure 6:
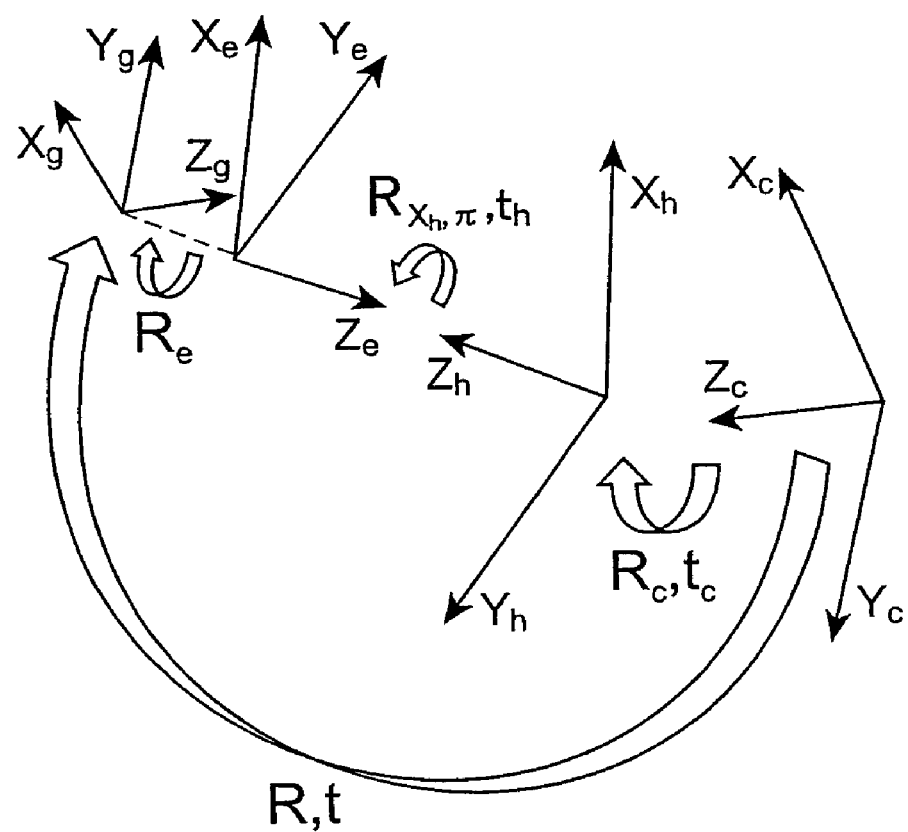
FIG. 6 is an illustration showing the relationship among the camera coordinate system, the face coordinate system, the eyeball coordinate system, and the gaze coordinate system where the face has moved.

The image processing apparatus 3 will be described below with reference to FIGS. 1 to 6. FIG. 2 is an illustration showing a camera coordinate system. FIG. 3 is an illustration showing the relationship among the camera coordinate system, a face coordinate system, an eyeball coordinate system, and a gaze coordinate system where the face is fixed. FIG. 4 is an illustration showing an eyeball model. FIG. 5 is an illustration showing a Dynamic Converging-Connected Gaze Model. FIG. 6 is an illustration showing the relationship among the camera coordinate system, the face coordinate system, the eyeball coordinate system, and the gaze coordinate system where the face has moved.

The image processing apparatus 3 is configured on a computer such as a personal computer. The image processing apparatus 3 is provided with a 3D model initializing part (3D model initializing means) 10, an estimating part (motion estimating means) 11, and an observation vector extracting part (observation vector extracting means) 12. The 3D model initializing part 10 and the estimating part 11 are constructed in such a way that an application program for image processing apparatus 3 is executed on a computer.

The image processing apparatus 3 handles N+2 (i=1, 2, . . . , N+2) feature points, N points (i=1, 2, . . . , N) of which are feature points of a face except for center points of pupils and two points (i=N+1, N+2) of which are the center points of the left and right pupils.

In the image processing apparatus 3, four coordinate systems are defined as shown in FIGS. 3 and 6. In FIGS. 3 to 6, $(X_c, Y_c, Z_c)$ represent mutually orthogonal three axes of the camera coordinate system being a reference coordinate system in image processing, $(X_h, Y_h, Z_h)$ mutually orthogonal three axes of the face coordinate system, $(X_e, Y_e, Z_e)$ mutually orthogonal three axes of the eyeball coordinate system, and $(X_g, Y_g, Z_g)$ mutually orthogonal three axes of the gaze (pupil) coordinate system.

The observation vector extracting part 12 extracts projected coordinates (u, v) of each feature point of the face on the image plane from each frame of the motion picture. The observation vector extracting part 12 is able to extract projected coordinates of each of multiple feature points of the face, for example, by a method called the eigenspace method. Concerning the details of the eigenspace method, reference should be made to M. A. Turk and A. P. Pentland, "Face recognition using eigenfaces," Proc. of IEEE Conf. on Computer Vision and Pattern Recognition, pp. 586-591, 1991. A method of extracting projected coordinates of feature points of a face on the basis of the eigenspace method will be briefly described below.

In the eigenspace method, the entire frame to be processed is searched, partial images at search positions are projected to a plurality of eigenspaces generated for respective feature points, and thereafter back projection is effected to obtain a plurality of approximate images. Each of the eigenspaces is generated using partial images of a corresponding feature point from images preliminarily taken from a plurality of subjects. The eigenspace method involves performing matching using all the approximate images obtained by the entire search, to specify an approximate image with the least error, and a position of an original partial image of the specified approximate image in the frame to be processed is defined as projected coordinates of a feature point to be extracted.

In order to realize the processing based on this eigenspace method, the observation vector extracting part 12 preliminarily acquires facial images of multiple subjects and generates eigenspaces W each of which is formed from a partial image of a corresponding feature point.

Here, let i (i is an integer of not less than 1) be a number of a feature point, and j (j is an integer of not less than 1) be a number of a subject. A covariance matrix $Q_i$ of partial image $L_i$ of feature point number i is obtained from partial images $L_{ij}$ of j=1-n, according to Eq (a-1) and Eq (a-2) below.

$$Q_i = \frac{\sum_{j=1}^{n}(L_{ij}-\overline{L_i})(L_{ij}-\overline{L_i})}{n-1} \quad (a\text{-}1)$$

$$\overline{L_i} = \frac{\sum_{j=1}^{n}L_{ij}}{n} \quad (a\text{-}2)$$

Supposing the number n of subjects is smaller than the number of dimensions of L, eigenvectors of covariance matrix $Q_i$ are given by $V_{ij}$ and eigenvalues by $\lambda_{ij}$ (j=1, ... n). Supposing $\lambda_1 > ... > \lambda_n$, eigenspaces $W_i$ of approximate $L_i$ are defined by Eq (a-3) below.

$$W_i = (v_1, \ldots, v_d), \quad \frac{\sum_{j=1}^{d}\lambda_{ij}}{\sum_{j=1}^{n}\lambda_{ij}} \quad (a\text{-}3)$$

The observation vector extracting part 12 generates a plurality of eigenspaces $W_i$ by the operations of Eqs (a-1), (a-2), and (a-3) and stores the eigenvectors and eigenvalues of the respective eigenspaces $W_i$.

The observation vector extracting part 12 searches an entire frame to be processed, clips a partial image I at each search position, and projects the partial image I onto all the aforementioned eigenspaces $W_i$ according to the operation of Eq (a-4) below, to obtain points $c_i$ on the respective eigenspaces.

$$c_i = W_i^T(I - \overline{L_i}) \quad (a\text{-}4)$$

The observation vector extracting part 12 performs the back projection of all the projected points $c_i$ according to the operation of Eq (a-5) below, to obtain an approximate image $I^A_i$ for each corresponding projected point $c_i$.

$$I^A_i = W_i c_i + \overline{L_i} \quad (a\text{-}5)$$

The observation vector extracting part 12 obtains errors E of all the approximate images obtained as a result of the entire search, according to the operation of Eq (a-6) below, and defines coordinates of an original partial image of an approximate image with the minimum error for each feature point, as projected coordinates of the corresponding feature point.

$$E = \|I^A_i - I^B_i\|, \quad I^B_i = W^T(W(I^A_i - \overline{L_i})) + \overline{L_i} \quad (a\text{-}6)$$

For the initial frame of the motion picture, the observation vector extracting part 12 extracts projected coordinates of all the feature points by the eigenspace method. For the other frames, the observation vector extracting part s12 can extract projected coordinates by block matching using partial images near the projected coordinates in the initial frame. The observation vector extracting part 12 may be arranged to extract the projected coordinates by the eigenspace method, for all the frames.

The 3D model initializing part 10 will be described below. The 3D model initializing part 10 defines 3D structures of feature points of a face and feature points of pupils (center points), based on the initial frame. The initial frame is the temporally first frame in the motion picture and frame as a reference in image processing. In the initial frame, the face is fixed, and the face coordinate system $(X_h, Y_h, Z_h)$ agrees with the camera coordinate system $(X_c, Y_c, Z_c)$.

The 3D model initializing part 10 first activates the observation vector extracting part 12 to extract from the image of the initial frame, projected coordinates $(u_i, v_i)$ of N facial feature points onto the image plane. The projected coordinates of the N points are used as initial projected coordinates in processing described hereinafter.

The 3D model initializing part 10 extracts coordinates $(x_i, y_i, z_i)$ (i=1, 2, ..., N) of N facial feature points from the image of the initial frame. The 3D model initializing part 10 defines the 3D structure of the face from the coordinates $(x_i, y_i, z_i)$ of the extracted facial feature points in accordance with a model coordinate arithmetic expression represented by Eq (1) below. The feature points $(x_i, y_i, z_i)$ of the face are positions on the camera coordinate system.

$$\begin{pmatrix} x_i \\ y_i \\ z_i \end{pmatrix} = \begin{pmatrix} u_i \\ v_i \\ 0 \end{pmatrix} + \alpha_i \begin{pmatrix} u_i\beta \\ v_i\beta \\ 1 \end{pmatrix} \quad (1)$$

$$i = 1, 2, \ldots, N$$

In Eq (1), i indicates a number of each of the N feature points of the face, and $(u_i, v_i)$ the initial projected coordinates of each feature point of the face on the CCD, which are obtained from the initial frame and which are fixed to the values thus determined. $\alpha_i$ indicates a distance from coordinates $(x_i, y_i, z_i)$ of each feature point of the face to the CCD, and indicates a depth of the feature point. $\beta$ is the inverse ($f^{-1}$) of the focal length f of the CCD camera.

The coordinates $(x_i, y_i, z_i)$ of the facial feature points defined by Eq (1) are model coordinates. The model coordinates are coordinates of the feature points in a state of a fixed positional relation between the face and the camera at the time when the initial frame was taken, and define the 3D structure of the face. Namely, the 3D model initializing part 10 extracts the initial projected coordinates $(u_i, v_i)$. The 3D model initializing part 10 sets initial values of $a_i$ in Eq (1), thereby initializing the 3D structure (3D model) of the face. The initial values of $\alpha_i$ in Eq (1) can be arbitrary values and, for example, are set to empirical values.

FIG. 2 shows the camera coordinate system, in which (0, 0, −f) represents the focal point of the CCD camera (the center of the lens of the camera) and in which the image plane (i.e., the CCD receiving light from the lens) is located the focal length f apart from the focal point. The origin (0, 0, 0) of the camera coordinate system is on the image plane. When a facial feature point $(x_c, y_c, z_c)$ is projected onto the image plane, projected coordinates thereof are given by (u, v, 0). In the Z-axis direction of the camera coordinate system, the depth from the origin (0, 0, 0) to the feature point $(x_c, y_c, z_c)$ is $\alpha$. In this camera coordinate system, the focal length f and the depth a are separated.

Next, the 3D model initializing part 10 extracts projected coordinates $(u_i, v_i)$ (i=N+1, N+2) of the center points of the left and right pupils onto the image plane from the image of the initial frame, and defines these projected coordinates as the initial projected coordinates of the center points of the pupils.

The 3D model initializing part 10 defines the 3D structure of the center point of each pupil, based on the initial projected coordinates $(u_i, v_i)$ of the center point of the pupil thus extracted, angles of rotation of the eyeball, and the depth on the camera coordinate system. For implementing it, there are the camera coordinate system $(X_c, Y_c, Z_c)$, the face coordinate system $(X_h, Y_h, Z_h)$, the eyeball coordinate system $(X_e, Y_e, Z_e)$, and the gaze coordinate system $(X_g, Y_g, Z_g)$ defined in the 3D model initializing part 10 (cf. FIG. 3). It is assumed in the image processing apparatus 3 that in the initial frame the Z-axis of the eyeball coordinate system $(X_e, Y_e, Z_e)$ is parallel but opposite in direction to that of the camera coordinate system $(X_c, Y_c, Z_c)$ and the face coordinate system $(X_h, Y_h, Z_h)$.

Where the eyeball rotates with the face being fixed, the gaze coordinate system $(X_g, Y_g, Z_g)$ is expressed by Eqs (2), (2-1), (2-2), and (2-3) below with respect to the face coordinate system $(X_h, Y_h, Z_h)$. A transformation $T_h^g$ from the face coordinate system $(X_h, Y_h, Z_h)$ (the camera coordinate system $(X_c, Y_c, Z_c)$) to the gaze coordinate system $(X_g, Y_g, Z_g)$ is expressed by a product of a transformation $T_h^e$ from the face coordinate system $(X_h, Y_h, Z_h)$ (the camera coordinate system $(X_c, Y_c, Z_c)$) to the eyeball coordinate system $(X_e, Y_e, Z_e)$ and a transformation $T_e^g$ from the eyeball coordinate system $(X_e, Y_e, Z_e)$ to the gaze coordinate system $(X_g, Y_g, Z_g)$ (cf. FIG. 3)

$$T_h^g = T_h^e T_e^g = \begin{pmatrix} R_{Xh,\pi} & t_h \\ 0 & 1 \end{pmatrix}\begin{pmatrix} R_e(\phi, \theta) & 0 \\ 0 & 1 \end{pmatrix} \quad (2)$$

$$t_h = \begin{pmatrix} u_i(1+\beta\alpha_i) \\ v_i(1+\beta\alpha_i) \\ \alpha_i + r_{eye} \end{pmatrix} \quad (2\text{-}1)$$

$$R_{Xh,\pi} = \begin{pmatrix} 1 & 0 & 0 \\ 0 & \cos\pi & -\sin\pi \\ 0 & \sin\pi & \cos\pi \end{pmatrix} \quad (2\text{-}2)$$

$$R_e(\phi, \theta) = \begin{pmatrix} \cos\theta & 0 & \sin\theta \\ -\sin\phi\sin\theta & \cos\phi & \sin\phi\cos\theta \\ -\cos\phi\sin\theta & -\sin\phi & \cos\phi\cos\theta \end{pmatrix} \quad (2\text{-}3)$$

In Eqs. (2), (2-1), (2-2), and (2-3), i is N+1 or N+2 and indicates a number of a feature point (center point) of the pupil. $T_h^g$ is the transformation (4×4 matrix) of the gaze coordinate system with respect to the face coordinate system. $T_h^e$ is the transformation (4×4 matrix) of the eyeball coordinate system with respect to the face coordinate system. The transformation $T_h^e$ is expressed by a translation $t_h$ (3×1 translation matrix) of the eyeball coordinate system with respect to the face coordinate system according to Eq (2-1) and a rotation $R_{Xh,\pi}$ (3×3 rotation matrix) of the eyeball coordinate system with respect to the face coordinate system according to Eq (2-2) (cf. FIG. 3). The translation $t_h$ is movement of the origin from the face coordinate system $(X_h, Y_h, Z_h)$ (the camera coordinate system $(X_c, Y_c, Z_c)$) to the eyeball coordinate system $(X_e, Y_e, Z_e)$. The rotation $R_{Xh,\pi}$ is a rotation of 180° relative to the Z-axis. In Eq (2-1), $u_i$ and $v_i$ are projected coordinate values of the center point of the pupil onto the image plane (CCD), $r_{eye}$ is the radius of the eyeball, and $\alpha_i$ the distance from the image plane (CCD) to the center point of the pupil (the depth of the pupil).

$T_e^g$ is the transformation (4×4 matrix) of the gaze coordinate system with respect to the eyeball coordinate system, and is expressed by a rotation $R_e$ (3×3 rotation matrix) of the gaze coordinate system with respect to the eyeball coordinate system according to Eq (2-3) (cf. FIG. 3). In Eq (2-3), $\phi$ and $\theta$ represent angles of rotation indicating a motion of the center point of the pupil (rotation of the eyeball) in the eyeball coordinate system. The rotation $R_e$ is a rotation from $I_0$ to $I$ of the center point of the pupil with rotation of the eyeball, as shown in FIG. 4. This I being the center point of the pupil is expressed by Eq (3).

$$\begin{pmatrix} I \\ 1 \end{pmatrix} = T_h^g\begin{pmatrix} I_0 \\ 1 \end{pmatrix} = T_h^g\begin{pmatrix} 0 \\ 0 \\ r_{eye} \\ 1 \end{pmatrix} \quad (3)$$

In Eq (3), $I_0$ represents the center point of the pupil in the eyeball coordinate system in the initial frame, and I the center point of the pupil from the face coordinate system. $I_0$, as shown in FIG. 4, is on the Z-axis in the eyeball coordinate system $(X_e, Y_e, Z_e)$, and is located at the radius $r_{eye}$ of the eyeball on the Z-axis. The movement from $I_0$ to I of the center point of the pupil with rotation of the eyeball is defined by two rotation angles $\theta$, $\phi$, as shown in FIG. 4. Namely, it is defined by angles of rotations relative to the $Y_e$ axis and the $X_e$ axis in the eyeball coordinate system $(X_e, Y_e, Z_e)$. The rotation angles permitting the rotations relative to the two axes are defined as dynamic parameters. Since $\theta$ and $\phi$ are rotatable relative to the $Y_e$ axis and the $X_e$ axis, they provide two degrees of freedom.

In FIG. 4, $r_{iris}$ centered around $I_0$ represents the radius of the pupil. When the radius $r_{iris}$ of the pupil is projected onto the image plane (CCD), it is given by Eq (4-1). Furthermore, where the radius $r_{eye}$ of the eyeball is expressed by the radius $s_i$ of the pupil projected onto the image plane, it is given by Eq (4-2) below.

$$s_i = \frac{r_{iris}}{1 + \beta\alpha_i} \quad (4\text{-}1)$$

$$r_{eye} = \frac{r_{eye}}{r_{iris}} \times \frac{r_{iris}}{s_i} \times s_i = \lambda s_i(1 + \beta\alpha_i) \quad (4\text{-}2)$$

In Eq (4-1) and Eq (4-2), i is N+1 or N+2, and $s_i$ the radius of the pupil projected onto the image plane (CCD). In Eq (4-2), $\lambda$ represents a ratio of radii of the eyeball and the pupil, and can be assumed to be a fixed value because there is little difference among people in general. Furthermore, assuming that the radii of the left and right eyeballs are equal, Eq (5) below holds.

$$s_{N+1}(1+\beta\alpha_{N+1}) = s_{N+2}(1+\beta\alpha_{N+2}) \quad (5)$$

In Eq (5), one of subscripts N+1, N+2 indicates the left eyeball (pupil) and the other the right eyeball (pupil).

The 3D model initializing part 10 defines the 3D structure of the center point of the pupil with eyeball motion in the fixed state of the face by a model coordinate arithmetic expression represented by Eq (6) below, which is derived from Eqs (2) to (5).

$$I = \begin{pmatrix} x_i \\ y_i \\ z_i \end{pmatrix} = \begin{pmatrix} (u_i + \lambda s_i \sin\theta) & (1 + \beta\alpha_i) \\ (v_i + \lambda s_i \sin\phi\cos\theta) & (1 + \beta\alpha_i) \\ (\alpha_i + \lambda s_i(1 - \cos\phi\cos\theta) & (1 + \beta\alpha_i) \end{pmatrix} \quad (6)$$

In Eq (6), i is N+1 or N+2, and $x_i$, $y_i$, $z_i$ are coordinate values of the center point of the pupil on the camera coordinate system where the face is fixed. Namely, I represents model coordinates of the center point of the pupil, and $x_i$, $y_i$, $z_i$ represent coordinate values of the model coordinates of the center point of the pupil. $\alpha_i$ has the relation represented by Eq (6-1) below.

$$\alpha_{N+2} = \frac{1}{\beta}\left(\frac{s_{N+1}}{s_{N+2}} - 1\right) + \frac{s_{N+1}}{s_{N+2}}\alpha_{N+1} \quad (6-1)$$

In Eq (6), the initial projected coordinates $(u_i, v_i)$ of the center point of the pupil are fixed values determined form the initial frame. The radius ratio $\lambda$ differs among people in practice, but the difference is small; therefore, a fixed value determined by body engineering is used. In passing, the radius ratio $\lambda$ may be a value actually measured. The rotation angles $(\theta, \phi)$ vary with rotation motion of the eyeball and are unknowns. Since the rotation angles $(\theta, \phi)$ are variable, they are handled as dynamic parameters. The focal length $\beta$ differs depending upon the CCD camera, and is an unknown. The depth $\alpha_i$ of the center point of the pupil originally has a fixed value, but is an unknown. Since the depth $\alpha_i$ converges at a certain value, it is handled as a static parameter.

In this manner, the 3D model initializing part 10 extracts the initial projected coordinates $(u_i, v_i)$ of the center point of the pupil, and sets the initial values of the static parameter. $\alpha_i$ and the dynamic parameters $\phi$ and $\theta$, thereby initializing the 3D structure (3D model) of the center point of the face. The initial values of $\alpha_i$, $\phi$, and $\theta$ in Eq (6) can be arbitrary values, and, for example, they are set to empirical values.

Concerning the depth $\alpha_i$ of the center point of the pupil, as indicated by Eq (5) to Eq (6-1), the depth $\alpha_{N+2}$ of one of the left and right pupils can be expressed by the other depth $\alpha_{N+1}$. Therefore, an estimation of the other depth $\alpha_{N+1}$ permits us to determine one depth The estimating part 11 will be described below. In the estimating part 11, a motion model of the face and a motion model of the eyeball are defined, and the Dynamic Converging-Connected Gaze Model (hereinafter referred to as DCCGM) is generated from these two motion models. The estimating part 11 applies an extended Kalman filter to the DCCGM to estimate the gaze.

Specifically, the estimating part 11 calculates predicted values of state variables including the aforementioned static parameter $\alpha$ and dynamic parameters $\theta$, $\phi$, and calculates estimates of coordinates of each feature point after a motion on the basis of the motion models from model coordinates estimated using the static parameter $\alpha$ and dynamic parameters $\theta$, $\phi$, included in the predicted values of the state variables, and the initial projected coordinates (u, v). The estimating part 11 calculates projected coordinates of estimates of coordinates of each feature point onto the image plane, i.e., estimates of an observation vector, based on an observation model, and filters the predicted values of the state variables, using the estimates of the observation vector and an observation vector extracted from a processing target frame, to calculate estimates of the state variables. This filtering is implemented using the extended Kalman filter. The estimating part 11 extracts the gaze direction, based on the dynamic parameters included in the estimates of the state variables.

The estimating part 11 will be described below in more detail. The estimating part 11 assumes the rotation motion and translation motion as motion models of the face. When a motion of the face is expressed by rotation and translation relative to the camera coordinate system $(X_c, Y_c, Z_c)$, coordinates $(x_{ci}, y_{ci}, \beta z_{ci})$ of each feature point of the face are expressed by a motion arithmetic expression of Eq (7-1) below.

$$\begin{pmatrix} x_{ci} \\ y_{ci} \\ \beta z_{ci} \end{pmatrix} = \begin{pmatrix} 1 & 0 & 0 \\ 0 & 1 & 0 \\ 0 & 0 & \beta \end{pmatrix}\left[\begin{pmatrix} t_x \\ t_y \\ t_z \end{pmatrix} + R_c \vec{m}_i\right] \quad (7-1)$$

In Eq (7-1), each of $x_{ci}$, $y_{ci}$, $z_{ci}$ is a coordinate value of a coordinate as a projection of each feature point of the face onto the camera coordinate system with motion of the face, and $(t_x, t_y, t_z)$ represent an amount of translation of the face coordinate system relative to the camera coordinate system $(X_c, Y_c, Z_c)$, and a 3×1 translation matrix. $R_c$ is a rotation matrix expressing a rotation of the face coordinate system relative to the camera coordinate system $(X_c, Y_c, Z_c)$, and 3×3 rotation matrix. Vector $m_i$ is a vector expression of model coordinates of each feature point of the face and, in the case of i=1, ... N (excluding the center points of the pupils), the vector $m_i$ can be expressed by Eq (7-1-1) below as rearrangement of Eq (1). The model coordinates of the center point of the pupil can be obtained from Eq (6).

$$\vec{m}_i = \begin{pmatrix} x_i \\ y_i \\ z_i \end{pmatrix} = \begin{pmatrix} u_i + \alpha_i u_i \beta \\ v_i + \alpha_i v_i \beta \\ \alpha_i \end{pmatrix} \quad (7-1-1)$$

In Eq (7-1) $R_c$ can be determined from Eq (7-1-2) below.

$$R_c = R(\delta q) \cdot R_{old} \quad (7-1-2)$$

In Eq (7-1-2), $R_{old}$ is $R_c$ obtained at a previous time before the present time being the point of time associated with the processing target frame, and can be a unit matrix at the beginning. R(q) can be expressed by Eq (7-1-3) below, and $\delta q$ by Eqs (7-1-4) and (7-1-5) below. Elements $w_x$, $w_y$, $w_z$ in (7-1-5) will be described later.

$$R(q) = \begin{pmatrix} q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{pmatrix} \quad (7-1-3)$$

$$\delta q = \left(\sqrt{1-\varepsilon}, \frac{w_x}{2}, \frac{w_y}{2}, \frac{w_z}{2}\right)^T \quad (7-1-4)$$

$$\varepsilon = \sqrt{\left(\frac{w_x}{2}\right)^2 + \left(\frac{w_y}{2}\right)^2 + \left(\frac{w_z}{2}\right)^2} \quad (7-1-5)$$

In the estimating part 11, the perspective transformation onto the image plane is assumed as an observation model. Estimates of projected coordinates as a projection of each feature point $(x_{ci}, y_{ci}, \beta z_{ci})$ of the face onto the image plane (CCD), i.e., estimates of vector $o_i$ (observation vector) can be expressed by an observation function f represented by Eq (7-2) below, using the coordinate values of the feature points of the face calculated from Eq (7-1).

$$\vec{o}_i = f(x_{ci}, y_{ci}, z_{ci}) = \begin{pmatrix} \dfrac{x_{ci}}{1 + \beta z_{ci}} \\ \dfrac{y_{ci}}{1 + \beta z_{ci}} \end{pmatrix} \quad (7\text{-}2)$$

Vector O being an observation vector for all the feature points of the face (i=1, 2, ..., N) can be expressed by Eq (7-3). In this manner, the estimating part 11 expresses the observation model for the feature points of the face.

$$\vec{O} = \begin{pmatrix} \vec{o}_1 \\ \vec{o}_2 \\ \vdots \\ \vec{o}_N \end{pmatrix} \quad (7\text{-}3)$$

In the estimating part 11, vector p being the state variables in the state transition expression (state transition model) of the motion model of the face is defined by Eq (8-1) below. The vector p is composed of facial pose and structure parameters. In the estimating part 11, a state space expression of the motion model of the face is defined by Eq (8-2) below.

$$\vec{p} = \begin{pmatrix} t_x \\ t_y \\ \beta t_z \\ w_x \\ w_y \\ w_z \\ \beta \\ \alpha_1 \\ \alpha_2 \\ \vdots \\ \alpha_{N+1} \end{pmatrix} \quad (8\text{-}1)$$

$$\vec{p}_t = A^{(1)} \vec{p}_{t-1} + \mu_t^{(1)} \quad (8\text{-}2)$$

In Eq (8-1), $(t_x, t_y, \beta t_z)$ indicate a translation amount of the face coordinate system $(X_h, Y_h, Z_h)$ with respect to the camera coordinate system $(X_c, Y_c, Z_c)$, and $(w_x, w_y, w_z)$ rotation amounts of the respective axes relative to the camera coordinate system $(X_c, Y_c, Z_c)$ from the previous frame, and amounts associated with the rotation matrix $R_c$. $\beta$ is the inverse of the focal length of the CCD camera, and $\alpha_1$-$\alpha_{N+1}$ respective depths of the facial feature points and the center point of the pupil. In Eq (8-2), subscript t indicates the present time (time associated with the present frame being a processing target frame), and subscript t−1 the previous time (time associated with the previous frame before the present frame). $A^{(1)}$ represents a state transition matrix indicating motion characteristics of the face in the state at the previous time before the present state, and $\mu_t^{(1)}$ noise in the state at the previous time before the present state. $\mu_t^{(1)}$ is a random vector of Gaussian distribution composed of the average of zero and a variance-covariance matrix $Q^{(1)}$ of noise.

In the estimating part 11, vector q being the state variables in the state transition expression (state transition model) of the motion model of the eyeball is defined by Eq (9-1). The vector q is composed of rotation parameters with two degrees of freedom. Furthermore, in the estimating part 11, a state space expression of the motion model of the eyeball is defined by Eq (9-2).

$$\vec{q} = \begin{pmatrix} \phi \\ \theta \end{pmatrix} \quad (9\text{-}1)$$

$$\vec{q}_t = A^{(2)} \vec{q}_{t-1} + \mu_t^{(2)} \quad (9\text{-}2)$$

In Eq (9-1), (θ, φ) are two rotation angles expressing the rotation 20 of the eyeball (cf. FIG. 4). In Eq (9-2), vector qt is state variables of the motion model of the eyeball at the present time, and vector $q_{t-1}$ state variables of the motion model of the eyeball at the previous time. $A^{(2)}$ is a state transition matrix expressing motion characteristics of the eyeball in the state at the previous time before the present state, and $\mu_t^{(2)}$ noise in the state at the previous time before the present state. $\mu_t^{(2)}$ is a random vector of Gaussian distribution composed of the average of zero and a variance-covariance matrix $Q^{(2)}$ of noise.

As seen from Eq (1) and Eq (6), the 3D structure of the feature points of the face and the 3D structure of the center points of the pupils are identical in the sense that they are defined using the image coordinates of the initial frame (initial projected coordinates). However, the movement amounts (θ, φ) on the dynamic image are added to the 3D structure of the center points of the pupils. In order to handle the motion of the eyeball coordinate system $(X_e, Y_e, Z_e)$, therefore, the estimating part 11 couples the motion model of the face to the motion model of the eyeball, as shown in FIG. 5, to generate the DCCGM for converging them at one point. Vectors $O_t$ (t=1, 2, ...) shown in FIG. 5 are observation vectors resulting from coupling of the state variable vectors p of the motion model of the face and the state variable vectors q of the motion model of the eyeball. Vector $O_t$ is composed of coordinates (projected coordinates) as a projection of all the model points, the feature points of the face (i=1, 2, ..., N) and the center points of the pupils (i=N+1, N+2), onto the image plane (CCD).

In the estimating part 11, a state space expression of DCCGM is defined by Eq (10-1) below, using the motion model of the face represented by Eqs (8-1) and (8-2) and the motion model of the eyeball represented by Eqs (9-1) and (9-2).

$$\vec{X}_t = \begin{pmatrix} \vec{p}_t \\ \vec{q}_t \end{pmatrix} = \begin{pmatrix} A^{(1)} & 0 \\ 0 & A^{(2)} \end{pmatrix} \vec{X}_{t-1} + \begin{pmatrix} \mu_t^{(1)} \\ \mu_t^{(2)} \end{pmatrix} \quad (10\text{-}1)$$

In Eq (10-1), vector $X_t$ is state variables of DCCGM consisting of vector $p_t$ and vector $q_t$ indicating the state variables of the motion model of the face and the motion model of the eyeball at the present time. Vector $X_{t-1}$ is state variables of DCCGM at the previous time. The estimating part 11 calculates predicted values $X_t^-$ of the state variables at the present time from the estimates $X_{t-1}$ of the state variables at the previous time on the basis of the state transition equation based on Eq (10-1).

Furthermore, in the estimating part 11 vector $O_t$ being an observation vector is defined by Eq (10-2) below.

$$\vec{O}_t = \begin{pmatrix} \vec{o}_1 \\ \vec{o}_2 \\ \vdots \\ \vec{o}_{N+1} \\ \vec{o}_{N+2} \end{pmatrix} = f(\vec{X}_t) + v_t \qquad (10\text{-}2)$$

In Eq (10-2), f( ) is the observation function, and $v_t$ represents noise. The vector $O_t$ includes (N+2) vectors $o_i$, i.e., observation vectors of N facial feature points and two pupil feature points.

In the estimating part 11, the 3D structure with motion of the face is defined by Eq (11) below which is a motion arithmetic expression to effect combined transformations (rotation and translation) of the model coordinates of the facial feature points (i=1, 2, ..., N) defined by Eq (1) and the model coordinates of the pupil center points (i=N+1, N+2) defined by Eq (6).

$$\begin{pmatrix} x_{ci} \\ y_{ci} \\ z_{ci} \\ 1 \end{pmatrix} = T_c^h \begin{pmatrix} x_i \\ y_i \\ z_i \\ 1 \end{pmatrix} = \begin{pmatrix} R_c & t_c \\ 0 & 1 \end{pmatrix} \begin{pmatrix} x_i \\ y_i \\ z_i \\ 1 \end{pmatrix} \qquad (11)$$

In Eq (11), $(x_i, y_i, z_i)$ indicate the model coordinates, $(x_{ci}, y_{ci}, z_{ci})$ coordinates as a projection of the facial feature points and the pupil center points onto the camera coordinate system with motion of the face, and $T_c^h$ a transformation (4×4 matrix) from the camera coordinate system $(X_c, Y_c, Z_c)$ to the face coordinate system $(X_h, Y_h, Z_h)$. $R_c$ is a 3×3 rotation matrix indicating the rotation of the face relative to the camera coordinate system, and $t_c$ a 3×1 translation matrix indicating the position movement of the face relative to the camera coordinate system (cf. FIG. 6). There are no restrictions on the motion of the face, and any motion can be expressed by rotation matrix $R_c$ and translation matrix $t_c$. Concerning $R_c$ and $t_c$, reference should be made to $R_c$ in Eq (7-1-2) and $(t_x, t_y, t_z)$ in Eq (7-1).

The estimating part 11 calculates estimates of coordinates of the feature points at the present time, using Eq (11). In the calculation of the estimates of the coordinates of the feature points, concerning the facial feature points (i=1, 2, ..., N), the estimating part 11 applies the model coordinates $(x_i, y_i, z_i)$, which are obtained by applying the parameters included in the predicted values $X_t^-$ of the state variables, and the initial projected coordinates to the model coordinate arithmetic expression represented by Eq (1), to Eq (11). Concerning the pupil center points (i=N+1, N+2), the estimating part 11 applies the model coordinates $(x_i, y_i, z_i)$, which are obtained by applying the parameters included in the predicted values $X_t^-$ of the state variables, and the initial projected coordinates to the model coordinate arithmetic expression represented by Eq (6), to Eq (11).

In the estimating part 11, vector $o_i$ (observation vector) as a projection of the coordinates $(x_{ci}, y_{ci}, z_{ci})$ of the facial feature points and the pupil center points represented by Eq (11), onto the image plane (CCD) is defined by Eq (12) below. Namely, the estimating part 11 applies the estimates $(x_{ci}, y_{ci}, z_{ci})$ of the coordinates of the facial feature points and the pupil center points obtained by Eq (11), to the observation function f of Eq (12), thereby calculating estimates of the observation vector.

$$\vec{o}_i = f(x_{ci}, y_{ci}, z_{ci}) = \begin{pmatrix} \dfrac{x_{ci}}{1+\beta z_{ci}} \\ \dfrac{y_{ci}}{1+\beta z_{ci}} \end{pmatrix} \qquad (12)$$

In order to estimate the state variables $X_t$ from the estimates of the observation vector $O_t$ represented by Eq (10-2), as described above, the estimating part 11 calculates the 3D structure with motion of the face, i.e., the estimates of the coordinates of the feature points, using Eq (11), and applies the estimates to Eq (12) to calculate the estimates of the observation vector $o_i$.

The estimating part 11 performs the extended Kalman filtering on the observation vector $O_t$ of Eq (10-2) to estimate the parameters $(\alpha_1\text{-}\alpha_{N+2}, \beta, \theta, \phi,$ etc.) of the vector $X_t$ (i.e., vector p being the state variables of the motion model of the face and vector q being the motion model of the eyeball) which are the state variables of Eq (10-1). This observation process is carried out using the estimates of the observation vector $o_i$ obtained by Eq (12) and the 3D structure obtained by Eq (11).

More specifically, the estimating part 11 executes predictions represented by Eqs (b-1) and (b-2) below, prior to execution of the estimation using the extended Kalman filter.

$$X_t^- = A X_{t-1} \qquad (b\text{-}1)$$

$$P_t^- = P_{t-1} + Q \qquad (b\text{-}2)$$

In Eq (b-1), A represents the state transition matrix in Eq (10-1), $X_{t-1}$ the estimates of the state variables at the previous time (time t−1), and $X_t^-$ the predicted values of the state variables at the present time (time t). It is assumed in the present embodiment that the time interval is short between frames of the motion picture and that the motion of the face between at the previous time and at the present time is negligible, and a unit matrix is used as A.

In Eq (b-2), $P_{t-1}$ is estimates of an estimation error covariance matrix at the previous time (time t−1), $P_t^-$ predicted values of an estimation error covariance matrix at the present time (time t), and Q a variance-covariance matrix of noise in the state transition model of Eq (10-1). Here the initial values of the elements of $P_{t-1}$ can be arbitrary values and, for example, are set to 0. The variance-covariance matrix Q of noise can be empirically determined from the motion of the face between frames.

After execution of these predictions, the estimating part 11 performs the extended Kalman filtering represented by Eq (c-1) below to calculate estimates of the state variables at the present time, and further calculates estimates of the estimation error covariance matrix at the present time according to Eq (c-2) below.

$$X_t = X_t^- + K_t(O_t - f(X_t^-)) \qquad (c\text{-}1)$$

$$P_t = (I - K_t J_t) P_t^- \qquad (c\text{-}2)$$

In Eq (c-1), $X_t$ indicates estimates of the state variables at the present time (time t), $X_t^-$ predicted values of the state variables at the present time (time t) obtained by Eq (b-1), $K_t$ a Kalman gain at the present time (time t), $O_t$ an observation vector actually extracted from the processing target frame at the present time, and $f(X_t^-)$ estimates of the observation vector obtained by applying the predicted values $X_t^-$ of the state variables at the present time to the observation function of Eq (12). In Eq (c-2), $P_t$ indicates estimates of the estimation error covariance matrix at the present time, and $P^-_t$ predicted values of the estimation error covariance matrix at the present time. $J_t$ is a Jacobian matrix of the observation function f.

For performing the operations according to Eq (c-1) and Eq (c2), the estimating part 11 calculates the Jacobian matrix $J_t$ by the operation of Eq (c-3) below, and thereafter calculates the Kalman gain by the operation of Eq (c-4) below. In Eq (c-4) below, C indicates the noise occurring in the observation process and, for example, represents noise due to camera shake. It is assumed in the present embodiment that the camera is fixed and this noise can be substantially negligible. Therefore, C is a unit matrix.

$$J_t[i, j] = \frac{\partial f_i}{\partial X[j]}(X_t^-) \tag{c-3}$$

$$K_t = P_t^- J_t^T (J_t P_t^- J_t^T + C) \tag{c-4}$$

For each parameter $X[j]$ of state variables X, $J[ij]$ in Eq (c-3) is given by Eq (c-5) below.

$$J[i, j] = \frac{\partial f_i}{\partial X[j]} = \frac{1}{1 + \beta z_{ci}} \begin{pmatrix} \frac{\partial x_{ci}}{\partial x[j]} \\ \frac{\partial y_{ci}}{\partial x[j]} \end{pmatrix} - \frac{\frac{\partial \beta z_{ci}}{\partial x[j]}}{(1 + \beta z_{ci})^2} \begin{pmatrix} x_{ci} \\ y_{ci} \end{pmatrix} \tag{c-5}$$

For each parameter $X[j]$ of state variables X, the arithmetic expressions of $(\partial x_{ci}/\partial X[j], \partial y_{ci}/\partial X[j])^T$ in Eq (c-5) are represented by Eqs (d-1)-(d-7) below.

$$\begin{pmatrix} \frac{\partial x_{ci}}{\partial t_x} \\ \frac{\partial y_{ci}}{\partial t_x} \\ \frac{\partial \beta z_{ci}}{\partial t_x} \end{pmatrix} = \begin{pmatrix} 1 \\ 0 \\ 0 \end{pmatrix}, \begin{pmatrix} \frac{\partial x_{ci}}{\partial t_y} \\ \frac{\partial y_{ci}}{\partial t_y} \\ \frac{\partial \beta z_{ci}}{\partial t_y} \end{pmatrix} = \begin{pmatrix} 0 \\ 1 \\ 0 \end{pmatrix}, \begin{pmatrix} \frac{\partial x_{ci}}{\partial t_z} \\ \frac{\partial y_{ci}}{\partial t_z} \\ \frac{\partial \beta z_{ci}}{\partial t_z} \end{pmatrix} = \begin{pmatrix} 0 \\ 0 \\ 1 \end{pmatrix} \tag{d-1}$$

$$\begin{pmatrix} \frac{\partial x_{ci}}{\partial w} \\ \frac{\partial y_{ci}}{\partial w} \\ \frac{\partial \beta z_{ci}}{\partial w} \end{pmatrix} = \begin{pmatrix} 1 & 0 & 0 \\ 0 & 1 & 0 \\ 0 & 0 & \beta \end{pmatrix} \cdot \frac{\partial R(\delta q)}{\partial w} \cdot R_{old} \cdot m_i \tag{d-2}$$

$$\frac{\partial R(\delta q)}{\partial w_x} = \begin{pmatrix} 0 & \frac{2w_y\varepsilon + w_xw_z}{4\varepsilon} & \frac{2w_z\varepsilon - w_xw_y}{4\varepsilon} \\ \frac{2w_y\varepsilon - w_xw_z}{4\varepsilon} & -w_x & \frac{w_x^2}{4\varepsilon} - \varepsilon \\ \frac{2w_z\varepsilon + w_xw_y}{4\varepsilon} & -\frac{w_x^2}{4\varepsilon} + \varepsilon & -w_x \end{pmatrix} \tag{d-2-1}$$

$$\frac{\partial R(\delta q)}{\partial w_x} = \begin{pmatrix} -w_y & \frac{2w_x\varepsilon + w_yw_z}{4\varepsilon} & -\frac{w_y^2}{4\varepsilon} + \varepsilon \\ \frac{2w_x\varepsilon - w_yw_z}{4\varepsilon} & 0 & \frac{2w_z\varepsilon + w_xw_y}{4\varepsilon} \\ \frac{w_y^2}{4\varepsilon} - \varepsilon & \frac{2w_z\varepsilon - w_xw_z}{4\varepsilon} & -w_y \end{pmatrix} \tag{d-2-2}$$

$$\frac{\partial R(\delta q)}{\partial w_z} = \begin{pmatrix} -w_z & \frac{w_z^2}{4\varepsilon} - \varepsilon & \frac{2w_x\varepsilon - w_yw_z}{4\varepsilon} \\ -\frac{w_z^2}{4\varepsilon} - \varepsilon & -w_z & \frac{2w_y\varepsilon + w_xw_z}{4\varepsilon} \\ \frac{2w_x\varepsilon - w_yw_z}{4\varepsilon} & \frac{2w_y\varepsilon - w_xw_z}{4\varepsilon} & 0 \end{pmatrix} \tag{d-2-3}$$

$$\begin{pmatrix} \frac{\partial x_{ci}}{\partial \beta} \\ \frac{\partial y_{ci}}{\partial \beta} \\ \frac{\partial \beta z_{ci}}{\partial \beta} \end{pmatrix} = \begin{pmatrix} 0 & 0 & 0 \\ 0 & 0 & 0 \\ 0 & 0 & 1 \end{pmatrix} \left[ \begin{pmatrix} t_x \\ t_y \\ t_z \end{pmatrix} + R_c m_i \right] + \tag{d-3}$$

$$\begin{pmatrix} 1 & 0 & 0 \\ 0 & 1 & 0 \\ 0 & 0 & \beta \end{pmatrix} R_c \cdot$$

$$\begin{cases} \begin{pmatrix} u_i \alpha_i \\ v_i \alpha_i \\ 0 \end{pmatrix}, i = 1, \ldots, N \\ \begin{pmatrix} (u_i + \lambda s_i \sin\theta)\alpha_i \\ (v_i + \lambda s_i \sin\phi\cos\theta)\alpha_i \\ \lambda s_i(1 - \cos\phi\cos\theta)\alpha_i \end{pmatrix}, i = N+1, N+2 \end{cases}$$

$$\begin{pmatrix} \frac{\partial x_{ci}}{\partial \alpha_i} \\ \frac{\partial y_{ci}}{\partial \alpha_i} \\ \frac{\partial \beta z_{ci}}{\partial \alpha_i} \end{pmatrix} = \begin{pmatrix} 1 & 0 & 0 \\ 0 & 1 & 0 \\ 0 & 0 & \beta \end{pmatrix} \cdot R_c \cdot \begin{pmatrix} \frac{\partial x_i}{\partial \alpha_i} \\ \frac{\partial y_i}{\partial \alpha_i} \\ \frac{\partial z_i}{\partial \alpha_i} \end{pmatrix} \tag{d-4}$$

$$= \begin{pmatrix} 1 & 0 & 0 \\ 0 & 1 & 0 \\ 0 & 0 & \beta \end{pmatrix} \cdot R_c \cdot \begin{pmatrix} u_i \beta \\ v_i \beta \\ 1 \end{pmatrix}, i = 1, \ldots N$$

$$\begin{pmatrix} \frac{\partial x_{ci}}{\partial \alpha_i} \\ \frac{\partial y_{ci}}{\partial \alpha_i} \\ \frac{\partial \beta z_{ci}}{\partial \alpha_i} \end{pmatrix} = \begin{pmatrix} 1 & 0 & 0 \\ 0 & 1 & 0 \\ 0 & 0 & \beta \end{pmatrix} \cdot R_c \cdot \begin{pmatrix} \frac{\partial x_i}{\partial \alpha_i} \\ \frac{\partial y_i}{\partial \alpha_i} \\ \frac{\partial z_i}{\partial \alpha_i} \end{pmatrix} \tag{d-5}$$

$$= \begin{pmatrix} 1 & 0 & 0 \\ 0 & 1 & 0 \\ 0 & 0 & \beta \end{pmatrix} \cdot R_c \cdot \begin{pmatrix} (u_i + \lambda s_i \sin\theta)\beta \\ (v_i + \lambda s_i \sin\phi\cos\theta)\beta \\ 1 + \lambda s_i(1 - \cos\phi\cos\theta)\beta \end{pmatrix},$$

$i = N+1, N+2$ $$\begin{pmatrix} \frac{\partial x_{ci}}{\partial \theta} \\ \frac{\partial y_{ci}}{\partial \theta} \\ \frac{\partial \beta z_{ci}}{\partial \theta} \end{pmatrix} = \begin{pmatrix} 1 & 0 & 0 \\ 0 & 1 & 0 \\ 0 & 0 & \beta \end{pmatrix} \cdot R_c \cdot \tag{d-6}$$

$$\begin{pmatrix} \lambda s_i \cos\theta(1 + \beta\alpha_i) \\ -\lambda s_i \sin\phi \sin\theta(1 + \beta\alpha_i) \\ \lambda s_i(1 + \cos\phi\sin\theta)(1 + \beta\alpha_i) \end{pmatrix}$$

-continued $$\begin{pmatrix} \frac{\partial x_{ci}}{\partial \phi} \\ \frac{\partial y_{ci}}{\partial \phi} \\ \frac{\partial \beta z_{ci}}{\partial \phi} \end{pmatrix} = \begin{pmatrix} 1 & 0 & 0 \\ 0 & 1 & 0 \\ 0 & 0 & \beta \end{pmatrix} \cdot R_c \cdot \qquad (d\text{-}7)$$

$$\begin{pmatrix} 0 \\ \lambda s_i \cos\phi \cos\theta(1 + \beta\alpha_i) \\ \lambda s_i(1 + \sin\phi \cos\theta)(1 + \beta\alpha_i) \end{pmatrix}$$

The estimating part 11 obtains the transformation $T_c^g$ (4×4 matrix) into the gaze coordinate system $(X_g, Y_g, Z_g)$ with respect to the camera coordinate system $(X_c, Y_c, Z_c)$ from the parameters estimated by the filtering. The transformation $T_c^g$, as represented by Eq (13), is a product of the transformation $T_c^h$ (4×4 matrix) from the camera coordinate system $(X_c, Y_c, Z_c)$ to the face coordinate system $(X_h, Y_h, Z_h)$ and the transformation $T_h^g$ (4×4 matrix) from the face coordinate system $(X_h, Y_h, Z_h)$ to the gaze coordinate system $(X_g, Y_g, Z_g)$. The transformation $T_c^h$ is set by the rotation matrix $R_c$ and the translation matrix $t_c$ according to the motion of the face, as indicated by Eq (11). The transformation $T_h^g$, as indicated by Eq (2), is set using the estimates of the respective parameters of vector p and vector q.

$$T_c^g = T_c^h T_h^g = \begin{pmatrix} R & t \\ 0 & 1 \end{pmatrix} \qquad (13)$$

$$R = \begin{pmatrix} R_{11} & R_{12} & R_{13} \\ R_{21} & R_{22} & R_{23} \\ R_{31} & R_{32} & R_{33} \end{pmatrix} \qquad (13\text{-}1)$$

In Eq (13), R represents a 3×3 rotation matrix indicating the rotation of the center point of the pupil relative to the camera coordinate system $(X_c, Y_c, Z_c)$, and t a 3×1 translation matrix indicating the position movement of the center point of the pupil relative to the camera coordinate system $(X_c, Y_c, Z_c)$ (cf. FIG. 6). The rotation matrix R is calculated using an arithmetic expression of Eq (e-1) below.

$$R(\phi, \theta) = R_{Xe, -\phi} R_{Ye, \theta} \qquad (e\text{-}1)$$

$$= \begin{pmatrix} 1 & 0 & 0 \\ 0 & \cos(-\phi) & -\sin(-\phi) \\ 0 & \sin(-\phi) & \cos(-\phi) \end{pmatrix} \begin{pmatrix} \cos\theta & 0 & \sin\theta \\ 0 & 1 & 0 \\ -\sin\theta & 0 & \cos\theta \end{pmatrix}$$

The estimating part 11 determines the direction indicated by the third column vector $(R_{13}, R_{23}, R_{33})^T$ of the rotation matrix R with a start point at the position indicated by the translation matrix t, as a gaze direction. This gaze direction is the direction common to the left and right eyes. In passing, the third column vector of the rotation matrix R is the direction of the Z-axis in the gaze coordinate system $(X_g, Y_g, Z_g)$.

In this manner, the image processing apparatus 3 generates the DCCGM as coupling of the facial motion model and the eyeball motion model and estimates the static parameter and dynamic parameters by the extended Kalman filter for the DCCGM. Then the image processing apparatus 3 determines the transformation matrix from the camera coordinate system $(X_c, Y_c, Z_c)$ to the gaze coordinate system $(X_g, Y_g, Z_g)$ from the estimates of the respective parameters, and determines the gaze direction.

Figure 7:
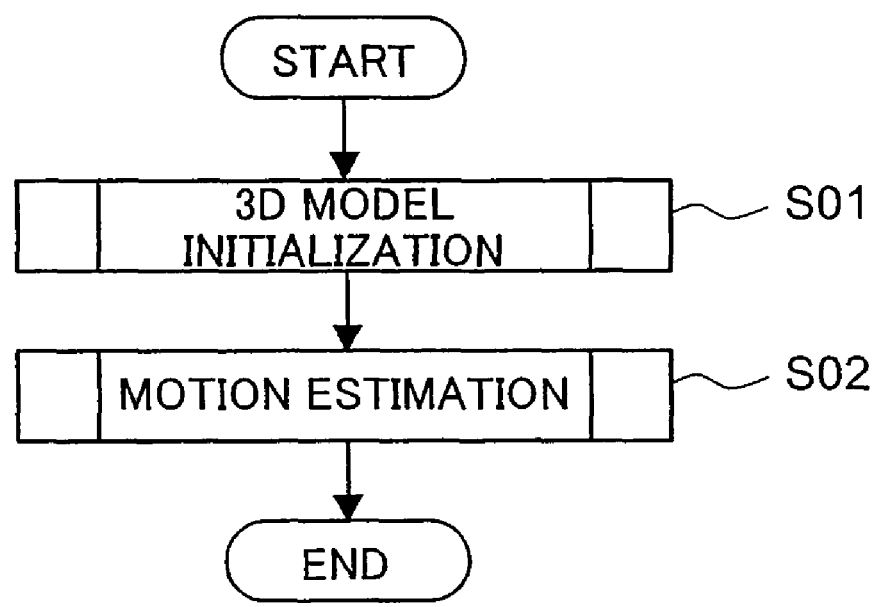
FIG. 7 is a flowchart showing a flow of an image processing method according to an embodiment of the present invention.

The operation of the image processing apparatus 3 will be described below, together with an image processing method according to an embodiment of the present invention. FIG. 7 is a flowchart showing the flow of the image processing method according to the embodiment of the present invention.

As shown in FIG. 7, this image processing method is comprised of a 3D model initialization step S01 executed by the 3D model initializing part 10 and a motion estimation step S02 executed by the estimating part 11.

Figure 8:
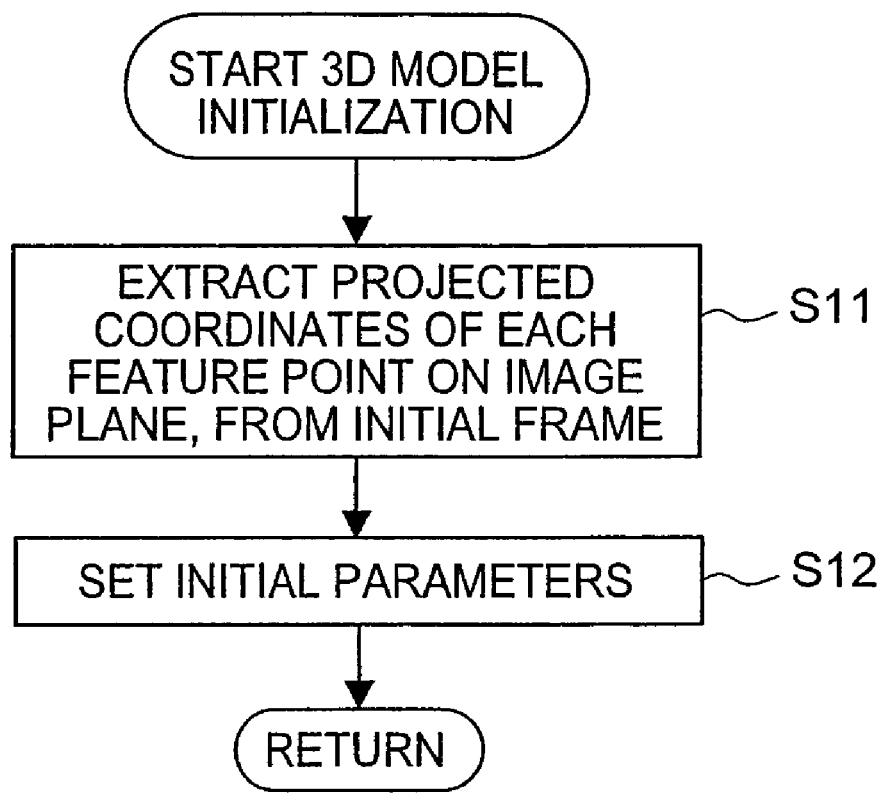
FIG. 8 is a flowchart showing a flow of a detailed process of a 3D model initialization step.

FIG. 8 is a flowchart showing the flow of the detailed process of the 3D model initialization step. In the 3D model initialization step S01, the 3D model initializing part 10 first makes the observation vector extracting part 12 extract the projected coordinates $(u_i, v_i)$ of the feature points (i=1, ..., N, N+1, N+2) on the image plane from the initial frame of the motion picture (step S11). This extracting method is carried out using the aforementioned eigenspace method. The projected coordinates extracted in the 3D model initialization step S01 are the initial projected coordinates.

Next, the 3D model initializing part 10 initializes the 3D model by setting the initial values of the parameters; $\alpha_i$ in Eq (1) for the facial feature points of i=1, ..., N; $\alpha_i$, $\phi$, and $\theta$ in Eq (6) for the pupil center points of i=N+1, N+2 (step S02).

Figure 9:
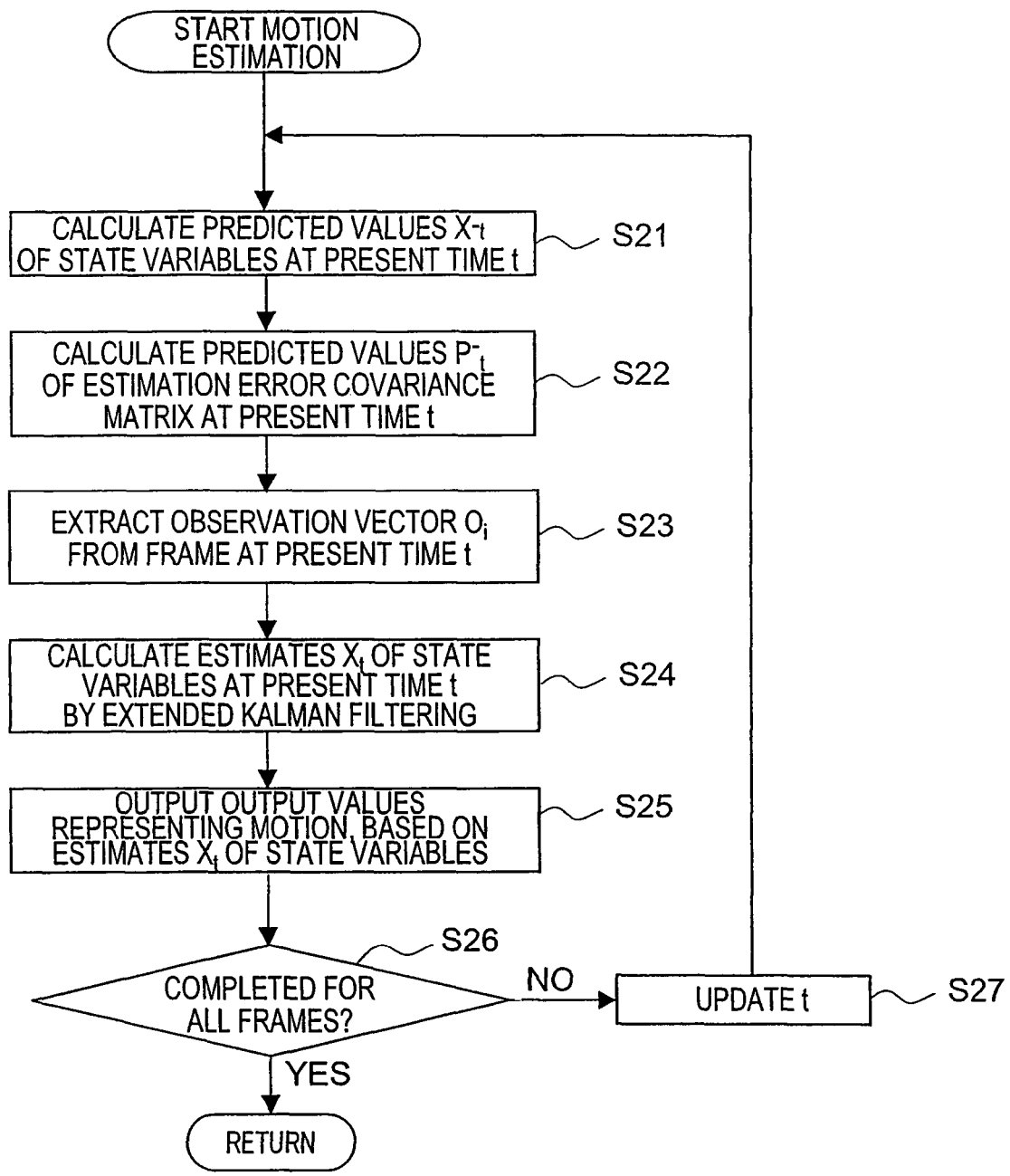
FIG. 9 is a flowchart showing a flow of a detailed process of a motion estimation step.

Next, the estimating part 11 executes the motion estimation step S02. FIG. 9 is a flowchart showing the flow of the detailed process of the motion estimation step. In the motion estimation step S02, as shown in FIG. 9, the estimating part 11 first executes the arithmetic expression of Eq (b-1) to calculate the predicted values $X^-_t$ of the state variables at the present time t (step S21). The estimating part 11 also executes the arithmetic expression of Eq (b-2) to calculate the predicted values $P^-_t$ of the estimation error covariance matrix at the present time t (step S22).

Figure 10:
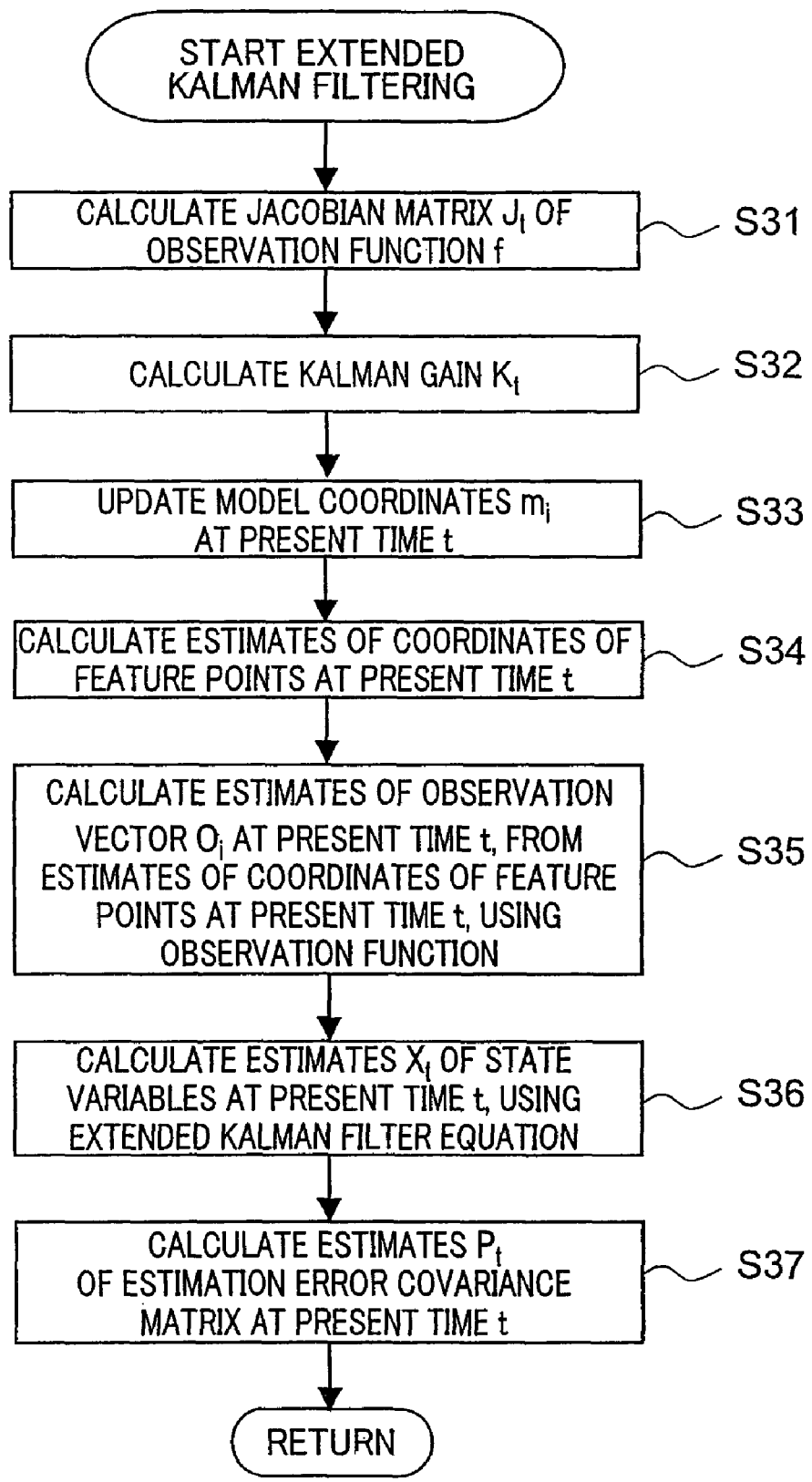
FIG. 10 is a flowchart showing a detailed flow of a process using an extended Kalman filter.

Then the estimating part 11 extracts the observation vectors $O_i$ (i=1, ..., N, N+1, N+2) from the processing target frame corresponding to the present time t (step S23). Then the estimating part 11 calculates the estimates $X_t$ of the state variables at the present time t by extended Kalman filtering (step S24). FIG. 10 is a flowchart showing the detailed flow of the process using the extended Kalman filter.

At step S24, as shown in FIG. 10, the estimating part 11 first executes the arithmetic expression of Eq (c-3) to calculate the Jacobian matrix $J_t$ of the observation matrix f (step S31). Then the estimating part 11 executes the arithmetic expression of Eq (c-4) to calculate the Kalman gain $K_t$ (step S32).

Then the estimating part 11 updates the model coordinates at the present time (step S33). At step S33, the model coordinates of the feature points of i=1, ..., N are calculated by applying the parameters in the predicted values $X_t$ of the state variables at the present time t and the initial projected coordinates to the arithmetic expression of Eq (7-1-1). In addition, the model coordinates of the feature points of i=N+1, N+2 (pupil center points) are calculated by applying the parameters in the predicted values $X_t$ of the state variables at the present time t and the initial projected coordinates to the arithmetic expression of Eq (6).

Then the estimating part 11 applies the model coordinates extracted at step S33, to the motion arithmetic expression of Eq (11) to calculate the estimates of coordinates of the feature points of i=1, ..., N, N+1, N+2 at the present time t (step S34).

Then the estimating part 11 applies the estimates of the coordinates of the feature points calculated at step S34, to the observation function of Eq (12) to calculate estimates of the projected coordinates of the feature points at the present time t (step S35). The projected coordinates calculated at step S35 are estimates of observation vectors $O_t$ at the present time t.

Then the estimating part 11 executes the arithmetic operation of the filter equation of Eq (c-1) to calculate the estimates $X_t$ of the state variables at the present time t (step S36). Then the estimating part 11 executes the arithmetic expression of Eq (c-2) to calculate the estimates $P_t$ of the estimation error covariance matrix at the present time t (step S37).

Returning to FIG. 9, the estimating part 11 then outputs output values indicating a motion, based on the estimates $X_t$ of the state variables (step S25). In the first embodiment mode, step S25 is to apply $\phi$ and $\theta$ in the estimates $X_t$ of the state variables at the present time t to the arithmetic expression of Eq (e-1) to calculate the rotation matrix R. Then the third column vector of the rotation matrix R, and the translation matrix t are outputted as the output values indicating the motion of the gaze direction.

Then the estimating part 11 tests whether the processing was accomplished for all the frames (step S26); when the processing is not accomplished for all the frames (in the case of NO), the time of current point t is updated (t=t+1) (step S27), and the processing is repeated from step S21. On the other hand, when the processing is accomplished for all the frames (in the case of YES), the estimating part 11 terminates the processing.

Figure 11:
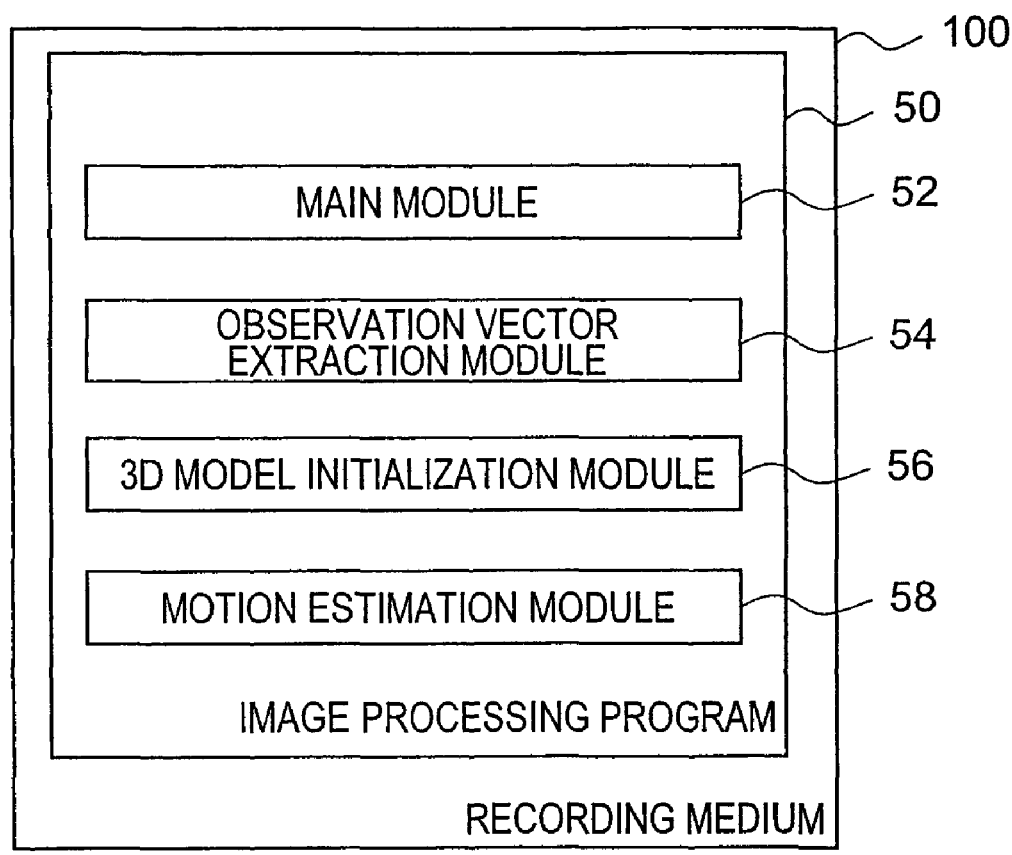
FIG. 11 is an illustration showing a configuration of an image processing program according to an embodiment of the present invention, together with a recording medium.

The following will describe embodiments of an image processing program for letting a computer operate as the image processing apparatus of the present invention and a recording medium storing the image processing program FIG. 11 is an illustration showing a configuration of an image processing program according to an embodiment of the present invention, together with a recording medium.

As shown in FIG. 11, the image processing program 50 is provided as stored in recording medium 100. The recording medium 100 is, for example, a recording medium such as a floppy disk, a CD-ROM, a DVD, or a ROM, or a semiconductor memory, or the like.

Figure 12:
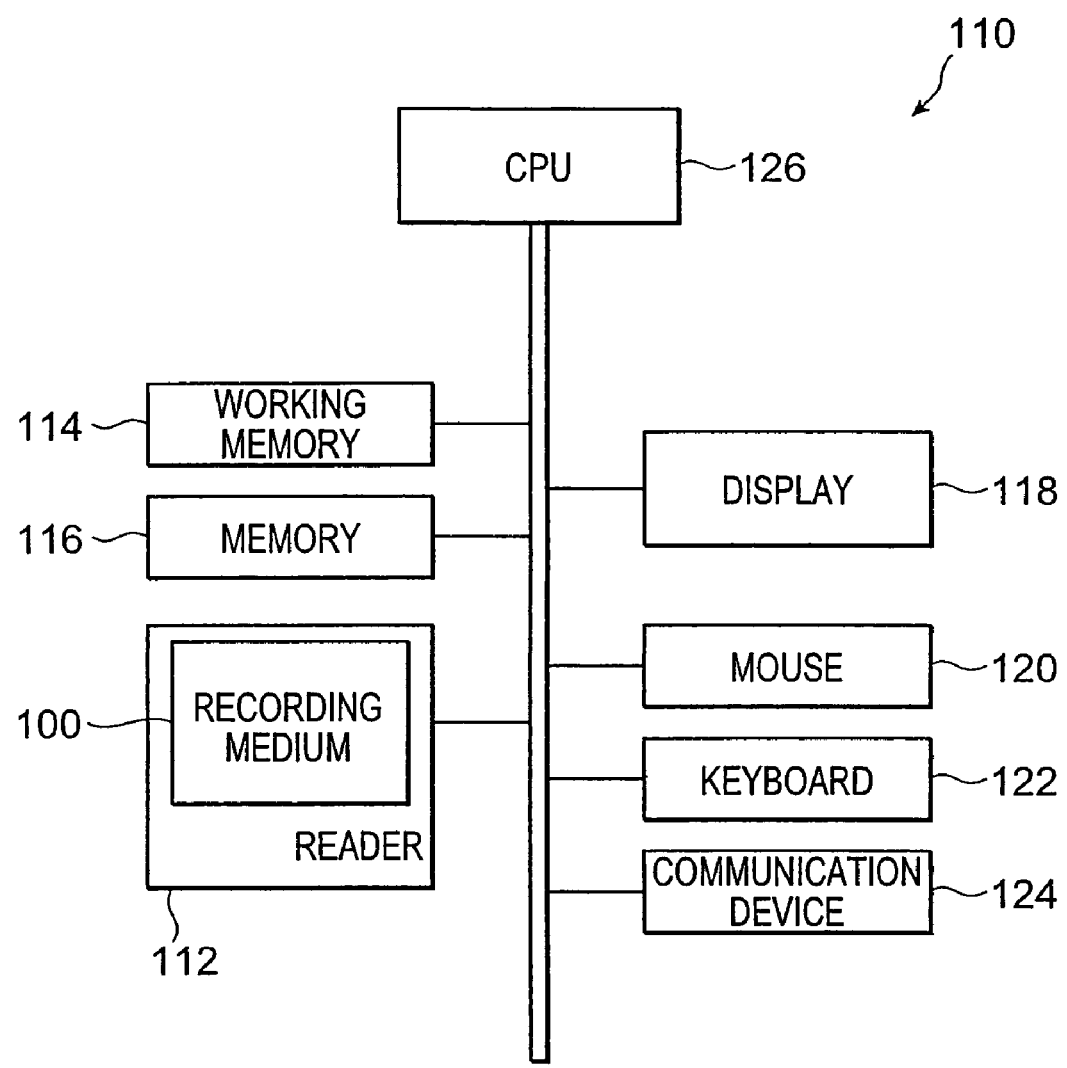
FIG. 12 is an illustration showing a hardware configuration of a computer for executing a program stored in a recording medium.
Figure 13:
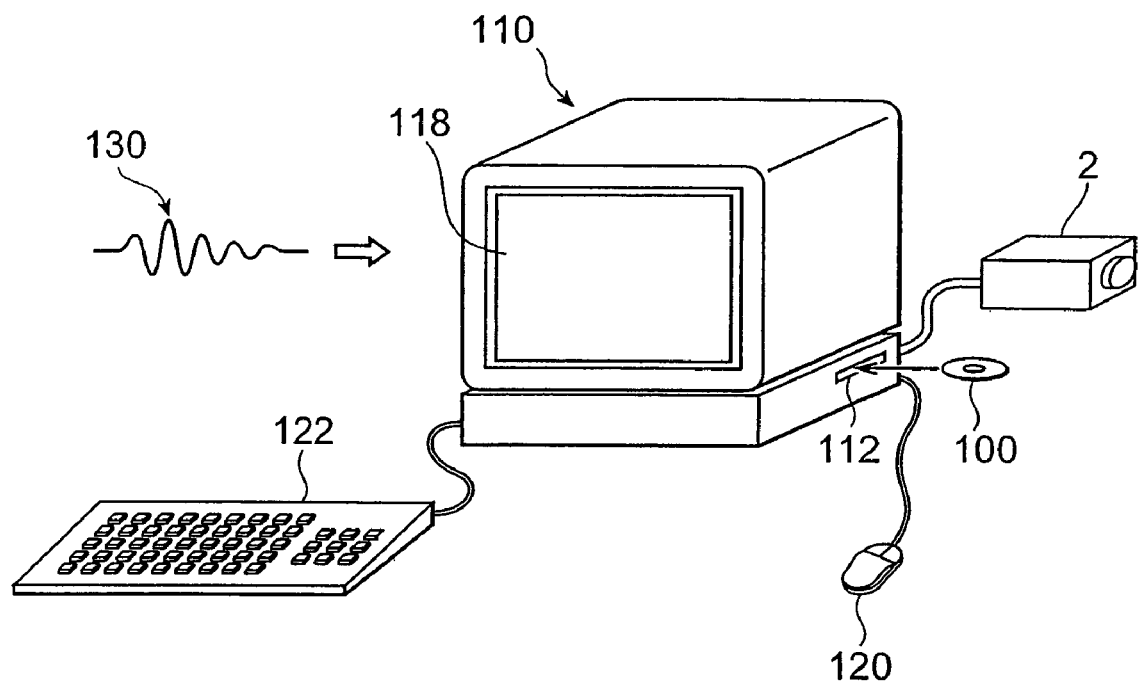
FIG. 13 is a perspective view of a computer for executing a program stored in a recording medium.

FIG. 12 is an illustration showing a hardware configuration of a computer for executing a program stored in a recording medium, and FIG. 13 a perspective view of a computer for executing a program stored in a recording medium. As shown in FIG. 12, computer 110 is provided with a reading device 112 such as a floppy disk drive, a CD-ROM drive, or a DVD drive, a working memory (RAM) 114 on which an operating system is resident, a memory 116 for storing a program stored in recording medium 100, a display device 118 such as a display, a mouse 120 and keyboard 122 as input devices, a communication device 124 for transmitting and receiving data and others, and a CPU 126 for controlling execution of the program. When the recording medium 100 is inserted into the reading device 112, the computer 110 becomes able to access the image processing program 50 stored in the recording medium 100, through the reading device 112, and becomes able to operate as the image processing apparatus 3 in accordance with the image processing program 50.

As shown in FIG. 13, the image processing program 50 may be one provided as computer data signal 130 superimposed on a carrier wave, through a network. In this case, the computer 110 stores the image processing program 50 received by the communication device 124, into the memory 116 and is then able to execute the image processing program 50.

As shown in FIG. 11, the image processing program 50 is comprised of a main module 52 for totally controlling the processing, an observation vector extraction module 54, a 3D model initialization module 56, and a motion estimation module 58.

The observation vector extraction module 54 makes a computer execute the same function as the aforementioned observation vector extracting part 12. The 3D model initialization module 56 makes the computer execute the aforementioned 3D model initialization step S01 and the motion estimation module 58 makes the computer execute the aforementioned motion estimation step S02. The 3D model initialization module 56 and the motion estimation module 58 arbitrarily invoke the observation vector extraction module 54 during their processing.

Figure 14A:
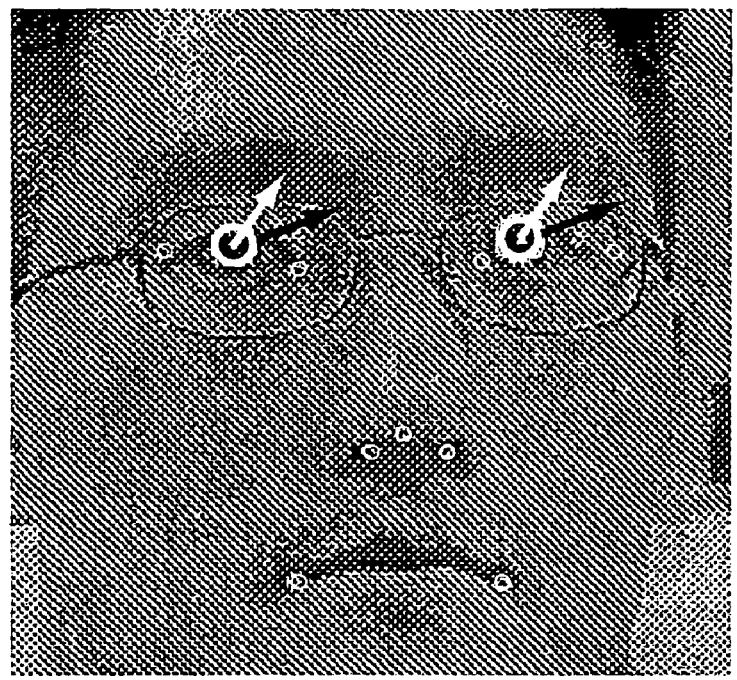
FIG. 14A is an image example of a face where the gaze is estimated in the image processing apparatus of FIG. 1, and where the facial pose is leftward and the gaze leftward.
Figure 14B:
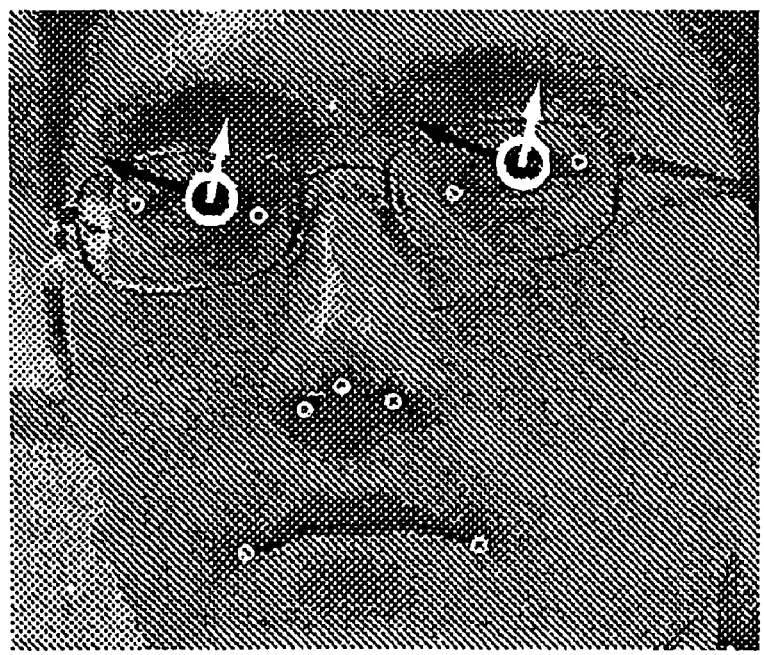
FIG. 14B is an image example of a face where the gaze is estimated in the image processing apparatus of FIG. 1, and where the facial pose is rightward and the gaze leftward.

An experiment was conducted for checking the validity of the image processing system 1 and the result of the experiment will be described below. FIG. 14A and FIG. 14B show an example of facial images on which gaze directions actually estimated by the image processing system 1 are drawn. This example uses the motion picture having the image size of 320×240. In FIGS. 14A and 14B, the direction of the facial pose is indicated by black arrows, the gaze direction by white arrows, the circumference of the pupils by large white circles, and feature points of the face by a number of small white circles. In the example of FIG. 14A, the facial pose is the left direction and the gaze the left direction closer to the center than the facial pose. In the example of FIG. 14B, the facial pose is the right direction and the gaze the left direction.

Since the image processing system 1 (image processing apparatus 3) is arranged to perform the modeling of the motion of the pupils possibly occurring in practice, by the mathematical expressions and the direct filtering of the static parameter and the dynamic parameters, the gaze direction can be estimated with a high degree of accuracy. In addition, the image processing system 1 is able to estimate the gaze relative to the unlimited facial motion with the monocular camera. Furthermore, since the image processing system 1 uses the most popular perspective transformation for the camera model, it has a broad range of application. The image processing system 1 is able to perform the contactless gaze estimation and does not require any expensive camera system or device.

Second Embodiment Mode

Figure 15A:
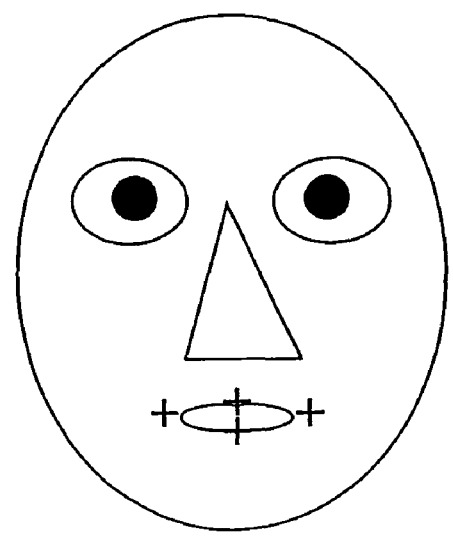
FIG. 15A is an illustration schematically showing feature points of lips of a face where the motion of the face and the motion of the lips are in an initial state.
Figure 15B:
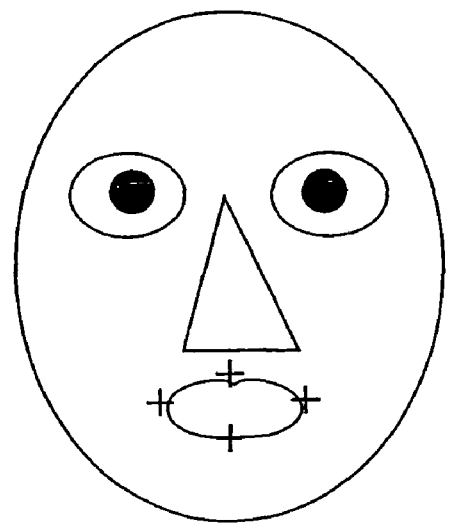
FIG. 15B is an illustration schematically showing feature points of lips of a face where only the lips have moved.
Figure 15C:
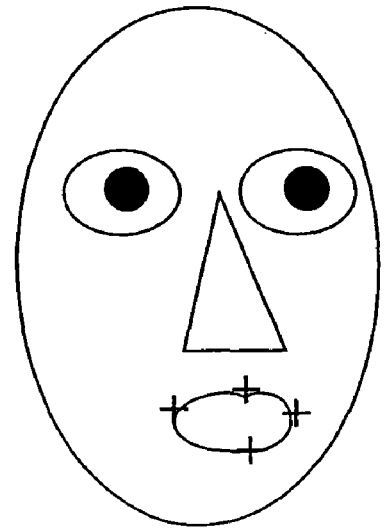
FIG. 15C is an illustration schematically showing feature points where a motion of the face is added to the motion of the lips shown in FIG. 15B.

Before explaining an image processing system according to the second embodiment mode, the motion of lips of a face will be described with reference to FIGS. 15A, 15B, and 15C. FIGS. 15A, 15B, and 15C schematically show facial images indicating feature points of the lips of the face, wherein FIG. 15A shows an initial state before a motion of the face and a motion of the lips, FIG. 15B a case where only the lips have moved, and FIG. 15C a case where a motion of the face is added to the motion of the lips of FIG. 15B.

The facial image of FIG. 15A shows an initial state in which the face looks straight forward and the lips are closed. For the lips, feature points (cross marks) are set at the left and right ends and at the upper and lower center ends. The facial image of FIG. 15B shows a state in which the lips are opened while the face looks straight forward. In this manner, the feature points of the lips change with motion of the lips. The facial image of FIG. 15C shows a state in which the face looks diagonally forward and the lips are opened. In this manner, the feature points of the lips further vary with addition of the motion of the face. Namely, the motions of the feature points on these three images are different from each other, depending upon the motion of the face and the change of the 3D shape of the lips.

In the case where the motion information of the lips is determined from the motion of the feature points set on the lips, as described above, the feature points on the facial image include mixture of the motion of the face and the motion of the lips. For this reason, the motion information of the lips with non-rigid change cannot be determined unless the motion of the face and the structure of the 3D shape of the lips are found out. In the second embodiment mode, therefore, the 3D structure of the face is defined by a rigid parameter for representing the rigid structure and a non-rigid parameter for representing the non-rigid change. The rigid structure is the 3D structure of the face without change in facial expression (i.e., without non-rigid change in the 3D shape of the face). The non-rigid change is a change of the 3D structure of the face due to change in facial expression. The face has portions with non-rigid change, not only the lips but also various portions such as the eyes, nose, and cheeks.

Image processing system 21 according to the second embodiment mode will be described below with reference to FIG. 1. In the second embodiment mode, configurations similar to those in the image processing system according to the first embodiment mode will be denoted by the same reference symbols, and the description thereof will be omitted herein.

The image processing system 21 uses a camera model of the perspective transformation to estimate a motion of each part (lips or the like) of the face in a contactless manner. In the image processing system 21, an image acquiring apparatus 2 is connected to an image processing apparatus 23, and the image processing apparatus 23 performs the optimal estimation of the motion of each part of the face from motion picture data acquired by the image acquiring apparatus 2. In the image processing system 21, an output device such as a monitor is also connected to the image processing apparatus 23 according to need.

Figure 16:
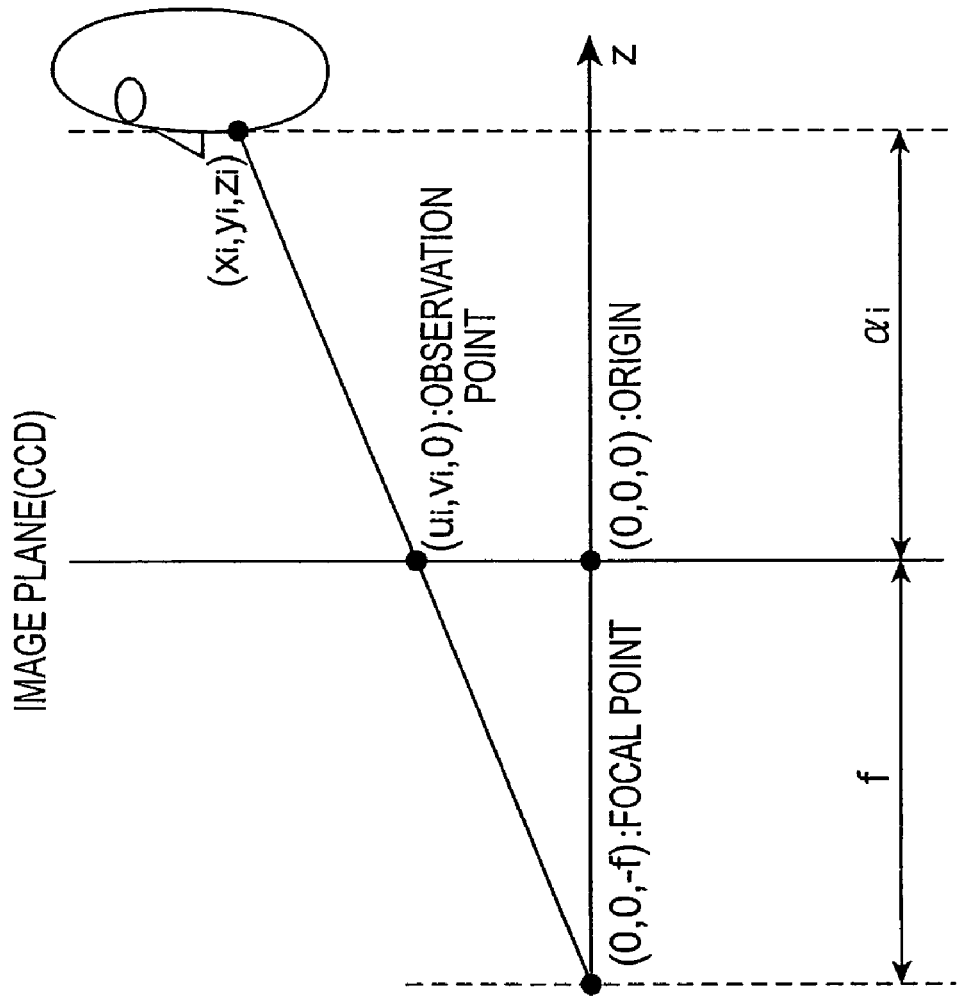
FIG. 16 is an illustration showing a model coordinate system.
Figure 17:
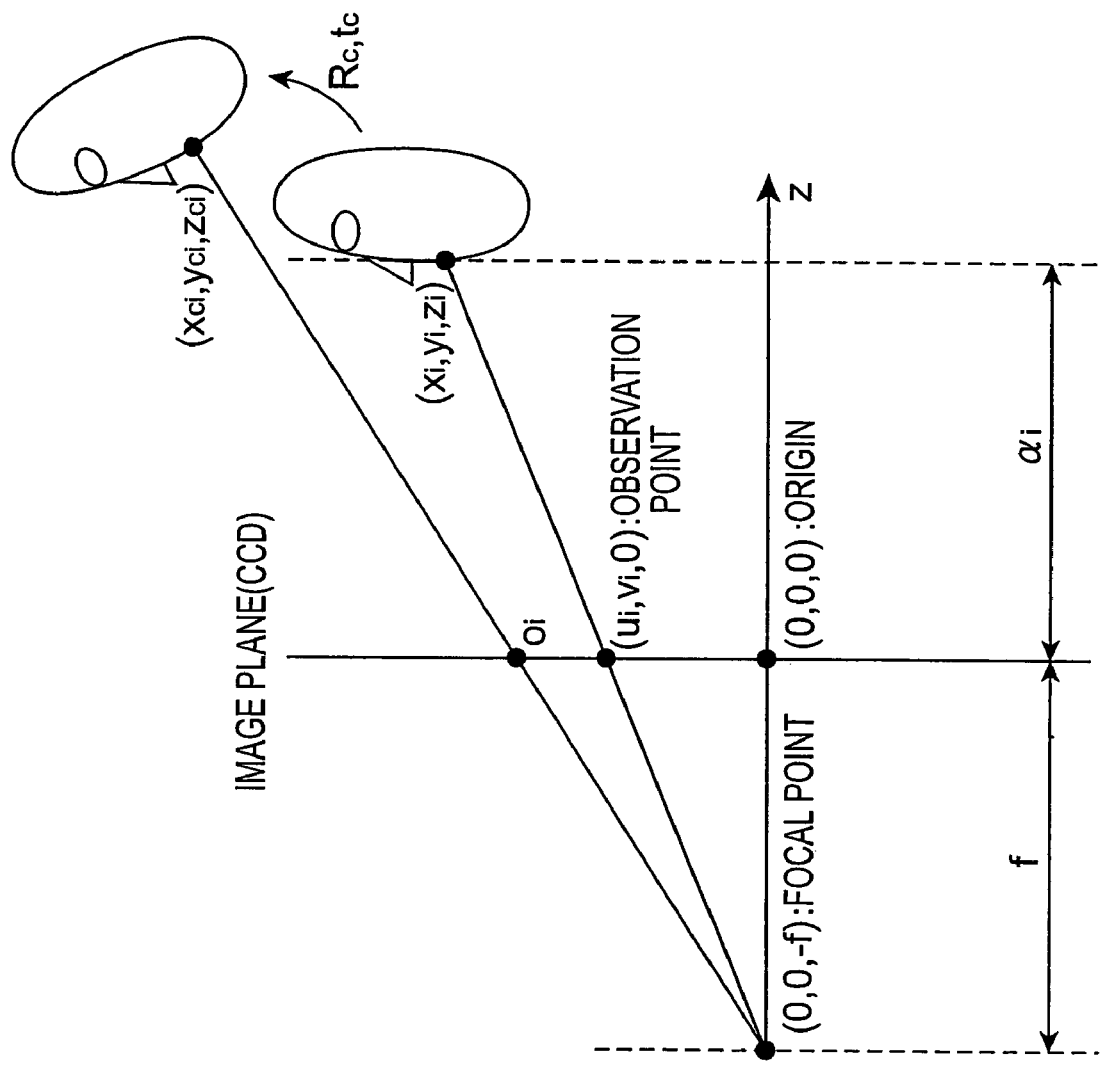
FIG. 17 is an illustration showing the model coordinate system with translation and rotation motions of a face.

The image processing apparatus 23 will be described with reference to FIGS. 1, 16, and 17. FIG. 16 is an illustration showing a model coordinate system. FIG. 17 is an illustration showing the model coordinate system where the face has translation and rotation motions.

The image processing apparatus 23 is a device similar to the image processing apparatus 3 according to the first embodiment mode, and is comprised of an observation vector extracting part 12, a 3D model initializing part 30, and an estimating part 31, but is different therefrom in the processes carried out in the respective parts 30, 31. The image processing apparatus 23 handles N (i=1, 2, . . . , N) feature points. In the image processing apparatus 23, a model coordinate system $(X_c, Y_c, Z_c)$, which is a reference coordinate system in execution of image processing, is defined.

The 3D model initializing part 30 will be described. The 3D model initializing part 30 defines the 3D structure of feature points of the face, based on the initial frame. In the initial frame, the face is fixed and the face coordinate system $(X_h, Y_h, Z_h)$ agrees with the camera coordinate system $(X_c, Y_c, Z_c)$. In the second embodiment mode, this camera coordinate system $(X_c, Y_c, Z_c)$ is defined as the model coordinate system.

The 3D model initializing part 30 extracts projected coordinates $(u_i, v_i)$ of N facial feature points $(x_i, y_i, z_i)$ (i=1, 2, . . . , N) from the image of the initial frame. The 3D model initializing part 30 defines model coordinates $(x_i, y_i, z_i)$ of the facial feature points according to a model coordinate arithmetic expression represented by Eq (14), using the projected coordinates $(u_i, v_i)$ thus extracted, to define the 3D structure of the face. Namely, the 3D model initializing part 30 sets initial values of parameters in Eq (14) defining the model coordinates. The facial feature points $(x_i, y_i, z_i)$ are positions on the model coordinate system.

$$\vec{m}_1 = \begin{pmatrix} x_i \\ y_i \\ z_i \end{pmatrix} = \begin{pmatrix} (u_i + \phi_i) & (1 + \alpha_i \beta) \\ (v_i + \zeta_i) & (1 + \alpha_i \beta) \\ & \alpha_i + \delta_i \end{pmatrix} \quad (14)$$

FIG. 16 shows the model coordinate system defined based on the initial frame. In FIG. 16, $(0, 0, -f)$ represents the focal point of the CCD camera and the image plane is located the focal length f apart therefrom. The origin $(0, 0, 0)$ of the model coordinate system is on the image plane. When a facial feature point $(x_i, y_i, z_i)$ is projected onto the image plane, it provides an observation point $(u_i, v_i, 0)$. In the direction of the Z-axis of the model coordinate system, the depth from the origin $(0, 0, 0)$ to each feature point $(x_i, y_i, z_i)$ is $\alpha_i$. In the model coordinate system, the focal length f and the depth α are separated.

Eq (14) indicates the model coordinate arithmetic expression for calculation of model coordinates of facial feature points. $(u_i, v_i, 0)$ are initial projected coordinates (image coordinates) as a projection of the facial feature points onto the CCD, and those determined with the initial frame are fixed to the values determined. $\alpha_i$ is the distance from each facial feature point $(x_i, y_i, z_i)$ to the CCD and indicates the depth of the feature point. $\alpha_i$ has a fixed value but is unknown. $\psi_i$ is a change amount of $u_i$ from the initial frame to the present frame and indicates a pixel movement amount of each feature point on the image. $\zeta_i$ is a change amount of $v_i$ from the initial frame to the present frame and indicates a pixel movement amount of each feature point on the image. $\delta_i$ is a change amount of ai from the initial frame to the present frame and indicates a movement amount of depth $\alpha_i$. $\psi_i$, $\zeta_i$, and $\delta_i$ are values varying with change in facial expression and are unknown. β is the inverse $(f^{-1})$ of the focal length f of the CCD camera, differs depending upon the CCD camera, and is unknown.

The depths $\alpha_i$ of the respective feature points indicate a rigid structure of the 3D structure of the feature points of the face and correspond to the 3D shape of the face. $\psi_i$, $\zeta_i$, and $\delta_i$ indicate a non-rigid change of the 3D structure of the feature points of the face and correspond to a change in facial expression such as a motion of lips. The movement amount δi of each depth $\alpha_i$ has little change with change in facial expression (i.e., in the case of the non-rigid change in the 3D shape of the face), and is thus negligible. Therefore, the non-rigid change at each feature point of the face can be determined by setting $\delta_i$ to 0 and inductively estimating the pixel movement amounts $(\psi_i, \zeta_i)$ from the feature points in the initial frame on the model coordinate system, using the images of the initial frame to the present frame.

For one 3D feature point, six parameters are generally needed to indicate the rigid structure and the non-rigid change thereof, but the present embodiment enables it with three parameters. Namely, a 3D feature point can be expressed by the rigid parameter $(\alpha_i)$ for representing the rigid structure and the non-rigid parameters $(\psi_i, \zeta_i)$ for representing the non-rigid change.

The estimating part 31 will be described. The estimating part 31 defines a motion model of the face, applies the extended Kalman filtering to the motion model of the face, and estimates the motion of each part of the face.

The estimating part 31 assumes a motion model expressed by rotation motion and translation motion, as the motion model of the face. When a motion of the face is expressed by rotation and translation with respect to the model coordinate system $(X_c, Y_c, Z_c)$, the facial feature points $(x_{ci}, y_{ci}, \beta z_{ci})$ are estimated from the model coordinates according to Eq (15-1) below (cf. FIG. 17).

$$\begin{pmatrix} x_{ci} \\ y_{ci} \\ \beta z_{ci} \end{pmatrix} = \begin{pmatrix} 1 & 0 & 0 \\ 0 & 1 & 0 \\ 0 & 0 & \beta \end{pmatrix} \left[ \begin{pmatrix} t_x \\ t_y \\ t_z \end{pmatrix} + R_c \vec{m}_i \right] \quad (15\text{-}1)$$

In Eq (15-1), $(t_x, t_y, t_z)$ are a 3×1 translation matrix $t_c$ from the model coordinate system $(X_i, Y_i, Z_i)$, $R_c$ is a 3×3 rotation matrix from the model coordinate system $(X_c, Y_c, Z_c)$, and vector $m_i$, i.e., model coordinates can be expressed by Eq (14). There are no restrictions on the facial motion and any motion can be expressed by the translation matrix $t_c$ and the rotation matrix $R_c$.

Estimates of vector $o_i$ (observation vector) as a projection of estimates $(x_{ci}, y_{ci}, \beta z_i)$ of coordinates of each feature point of the face are calculated according to Eq (15-2) below from the estimates $(x_{ci}, y_{ci}, \beta z_{ci})$ of coordinates of the feature point of the face calculated according to the arithmetic expression of Eq (15-1) (cf. FIG. 17).

$$\vec{o} = \begin{pmatrix} \dfrac{x_{ci}}{1+\beta z_{ci}} \\ \dfrac{y_{ci}}{1+\beta z_{ci}} \end{pmatrix} \quad (15\text{-}2)$$

Vector O consisting of the observation vectors for all the facial feature points (i=1, 2, ..., N) can be expressed by Eq (15-3) below. In this manner, the estimating part 31 expresses the observation model for the facial feature points.

$$\vec{O} = \begin{pmatrix} \vec{o}_1 \\ \vec{o}_2 \\ \cdots \\ \cdots \\ \cdots \\ \vec{o}_N \end{pmatrix} \quad (15\text{-}3)$$

In the estimating part 31, vector X, which is state variables in a state space expression (state transition model) of the facial motion model, is defined by Eq (16-1) below. The vector X is composed of the facial pose and the rigid parameter and non-rigid parameters. Furthermore, in the estimating part 31 the state space expression of the facial motion model is defined by Eq (16-2).

$$\vec{X} = \begin{pmatrix} t_x \\ t_y \\ \beta t_z \\ w_x \\ w_y \\ w_z \\ \beta \\ \alpha_1 \\ \alpha_2 \\ \vdots \\ \alpha_N \\ \phi_1 \\ \phi_2 \\ \vdots \\ \phi_N \\ \zeta_1 \\ \zeta_2 \\ \vdots \\ \zeta_N \end{pmatrix} \quad (16\text{-}1)$$

$$\vec{X} = \Lambda^{(1)} \vec{X}_{t-1} + \mu_t^{(1)} \quad (16\text{-}2)$$

In Eq (16-1), $(t_x, t_y, \beta t_z)$ represent a translation amount in the model coordinate system of the face $(X_c, Y_c, Z_c)$, $(w_x, w_y, w_z)$ rotation amounts of the respective axes in the model coordinate system $(X_c, Y_c, Z_c)$ from the previous frame, $\beta$ the inverse of the focal length of the CCD camera, $\alpha_1$-$\alpha_N$ depths of the respective feature points of the face, $\psi_1$-$\psi_N$ change amounts of $u_1$-$u_N$ being the coordinates of the feature points on the image from the initial frame to the present frame, and $\zeta_1$-$\zeta_N$ change amounts of $v_1$-$v_N$ being the coordinates of the feature points on the image, from the initial frame to the present frame. In Eq (16-2), subscript t indicates the present time (time corresponding to the present frame), subscript t−1 the previous time (time corresponding to the previous frame), $\Lambda^{(1)}$ a state transition matrix indicating facial motion characteristics in the state at the previous time from the present state, and $\mu_t^{(1)}$ noise in the state at the previous time from the present state. Particularly, $\mu_t^{(1)}$ is a random vector of Gaussian distribution composed of the average of zero and a variance-covariance matrix.

In the estimating part 31, the relationship between vector $X_t$ as the state variables in the facial motion model and vector $O_t$ as the observation vector is defined by Eq (17) below. The vector $O_t$ includes N vectors $o_i$. In Eq (17), f( ) represents an observation function, and $v_t$ noise, a random vector comprised of the average of zero and the covariance matrix $R^{(1)}$ of noise. The observation function f( ) with a variable of vector $X_t$ is expressed as in Eq (17-1) below by observation functions $f_i(\ )$ using estimates of coordinates $(x_{ci}, y_{ci}, z_{ci})$ of the respective feature points.

$$\vec{O} = \begin{pmatrix} \vec{o}_1 \\ \vec{o}_2 \\ \cdots \\ \cdots \\ \cdots \\ \vec{o}_N \end{pmatrix} f(\vec{X}_t) + v_t \quad (17)$$

-continued $$f(\vec{X}_t) = \begin{pmatrix} f_1(\vec{X}_t) \\ \cdots \\ \cdots \\ \cdots \\ f_N(\vec{X}_t) \end{pmatrix} \quad (17\text{-}1)$$

In the estimating part 31, in order to estimate the state variables $X_t$ from the observation vector $O_t$ represented by Eq (17), estimates of vector $o_i$ (observation vector) as a projection of estimates ($x_{ci}$, $y_{ci}$, $z_{ci}$) of coordinates of each feature point of the face onto the image plane (CCD) are further defined by Eq (17-2) below.

$$\vec{o}_i = \begin{pmatrix} \dfrac{x_{ci}}{1+\beta z_{ci}} \\ \dfrac{y_{ci}}{1+\beta z_{ci}} \end{pmatrix} = f_i(\vec{X}_t) \quad (17\text{-}2)$$

It is seen from Eq (17) that the relationship between vector $X_t$ as the state variables and vector $O_t$ as the observation vector is nonlinear. Then, the estimating part 31 applies the extended Kalman filtering to the observation vector $O_t$ of Eq (17) to estimate the parameters of vector $X_t$ ($t_x$, $t_y$, $\beta t_z$, $w_x$, $w_y$, $w_z$, $\alpha_1$-$\alpha_N$, $\beta$, $\psi_1$-$\psi_N$, $\zeta_1$-$\zeta_N$) being the state variables of the facial motion model of Eq (16-1). This observation process is carried out using the observation vectors $o_i$ of Eq (15-2) and the 3D structure of Eq (15-1).

While taking the facial translation and rotation motions into consideration, the estimating part 31 uses the estimated parameters to estimate the 3D structure of the face and the non-rigid change of the feature points set with the initial frame and to obtain the motion information of each part of the face.

In this manner, the image processing apparatus 23 estimates the parameters of vector $X_t$ being the state variables, by the extended Kalman filter for the facial motion model and estimates the motions of translation and rotation of the face, the rigid structure at each feature point of the face, and the non-rigid change at each feature point of the face. Then the image processing apparatus 23 determines the motion of each part of the face with non-rigid deformation while dealing with the facial motion, from the estimates of the parameters.

The following will describe the operation of this image processing apparatus 23 and an image processing method executed by the image processing apparatus 23. Only operations different from those in the first embodiment mode will be described below with reference to aforementioned FIGS. 7 to 10.

The image processing method of the second embodiment mode is also comprised of 3D model initialization step S01 and motion estimation step S02. In the 3D model initialization step S01, the 3D model initializing part 30 extracts the initial projected coordinates of N facial feature points at step S11. At step S12, the 3D model initializing part 30 sets the initial values of the aforementioned parameters including $\alpha_1$-$\alpha_N$, $\psi_1$-$\psi_N$, and $\zeta_1$-$\zeta_N$ to initialize the 3D model.

In the motion estimation step S02, the estimating part 31 performs the processes of step S21 to step S23 similar to those in the first embodiment mode, and at step S24 the estimating part 31 calculates the Jacobian matrix $J_t$ of observation function f (step S31). The Jacobian matrix can be determined by Eq (c-3) and Eq (c-5); however, since the state variables X in the second embodiment mode are different from those in the first embodiment mode, the estimating part 31 executes the arithmetic expressions of aforementioned Eqs (d-1) to (d-4) and Eqs (d-8) and (d-9) below.

$$\begin{pmatrix} \dfrac{\partial x_{ci}}{\partial \zeta_i} \\ \dfrac{\partial y_{ci}}{\partial \zeta_i} \\ \dfrac{\partial \beta z_{ci}}{\partial \zeta_i} \end{pmatrix} = \begin{pmatrix} 1 & 0 & 0 \\ 0 & 1 & 0 \\ 0 & 0 & \beta \end{pmatrix} R_c \begin{pmatrix} \dfrac{\partial x_i}{\partial \zeta_i} \\ \dfrac{\partial y_i}{\partial \zeta_i} \\ \dfrac{\partial z_i}{\partial \zeta_i} \end{pmatrix} = \begin{pmatrix} 1 & 0 & 0 \\ 0 & 1 & 0 \\ 0 & 0 & \beta \end{pmatrix} R_c \begin{pmatrix} 1+\alpha_i\beta \\ 0 \\ 0 \end{pmatrix} \quad (d\text{-}8)$$

$$\begin{pmatrix} \dfrac{\partial x_{ci}}{\partial \psi_i} \\ \dfrac{\partial y_{ci}}{\partial \psi_i} \\ \dfrac{\partial \beta z_{ci}}{\partial \psi_i} \end{pmatrix} = \begin{pmatrix} 1 & 0 & 0 \\ 0 & 1 & 0 \\ 0 & 0 & \beta \end{pmatrix} R_c \begin{pmatrix} \dfrac{\partial x_i}{\partial \psi_i} \\ \dfrac{\partial y_i}{\partial \psi_i} \\ \dfrac{\partial z_i}{\partial \psi_i} \end{pmatrix} = \begin{pmatrix} 1 & 0 & 0 \\ 0 & 1 & 0 \\ 0 & 0 & \beta \end{pmatrix} R_c \begin{pmatrix} 0 \\ 1+\alpha_i\beta \\ 0 \end{pmatrix} \quad (d\text{-}9)$$

Then the estimating part 31 applies the parameters in the predicted values $X^-_t$ of the state variables at the present time t to the arithmetic expression of Eq (14) to update the model coordinates $m_i$ at the present time t (step S33), and then executes the arithmetic expression of Eq (15-1) to calculate estimates of coordinates of the feature points at the present time t (step S34).

Then the estimating part 31 substitutes the estimates of the coordinates of the feature points at the present time t into the observation function f of Eq (17-2) to calculate estimates of observation vector $O_i$ at the present time t (step S35).

Then the estimating part 31 executes the processes of step S36 and step S37 in the same manner as in the first embodiment mode, to calculate the estimates $X_t$ of the state variables at the present time t. At next step S25, the estimating part 31 outputs the parameters of the estimates $X_t$ of the state variables at the present time t without modification, as output values indicating the motion of each part of the face. Then the estimating part 31 executes step S26 similar to that in the first embodiment mode and, when the test at step S26 results in NO, the estimating part 31 moves to step S27. When the test ends with YES, the processing is terminated.

The following will describe an image processing program for letting a computer operate as the image processing apparatus 23 of the second embodiment mode and a recording medium storing the image processing program. As shown in FIG. 11, the image processing program 50 of the second embodiment mode also has much the same configuration as the image processing program of the first embodiment mode and the recording medium 100 is also the same. In the image processing program 50 of the second embodiment mode, the 3D model initialization module 56 makes the computer execute the 3D model initialization step S01 of the second embodiment mode, and the motion estimation module 58 makes the computer execute the motion estimation step S02 of the second embodiment mode.

As described above, the image processing system 21 (image processing apparatus 23) involves performing the modeling of the facial 3D structure by the rigid parameter and non-rigid parameters and the direct filtering of the rigid parameter and non-rigid parameters, whereby it is able to estimate the motion of each part of the face with a high degree of accuracy even with change in facial expression. Particularly, the image processing system 21 is able to obtain the non-rigid motion information of each part of the face, irrespective of the facial motion. The image processing system 21 can estimate the motion of each part of the face with respect to the unlimited facial motion with the monocular camera. Furthermore, since the image processing system 21 uses the most popular perspective transformation for the camera model, it has a wide range of application. The image processing system 21 is able to estimate the motion of each part of the face in a contactless manner, and does not require any expensive camera system or device.

The above described the embodiments of the present invention, but it is noted that the present invention can be carried out in various modes without being limited to the above embodiments.

For example, the present embodiment adopted the configuration of the image processing apparatus implemented by execution of the application program on the computer, but it may be constructed as an image processing apparatus dedicated to estimation of the gaze or the motion of each part of the face, or may be incorporated in a device necessitating the human gaze information or the motion information of each part of the face (e.g., a robot or an automobile safety device).

The present embodiment adopted the configuration wherein the image processing apparatus for estimation of the gaze was constructed separately from the image processing apparatus for estimation of the motion of each part of the face with non-rigid change, but the image processing apparatuses for estimating the gaze and the motion of each part of the face with non-rigid change may be integrally constructed as a single device.

The present embodiment adopted the extended Kalman filter for estimation of the state variables, but they may also be estimated by another filter, means except for the filters, or the like.

The second embodiment mode adopted the face as the 3D object, but the present invention is also applicable to every 3D object the whole of which makes translation and rotation motions and each part of which undergoes non-rigid change, e.g., a heart.

INDUSTRIAL APPLICABILITY

The present invention permits high-accuracy determination of motion of the 3D object. Particularly, the gaze can be determined with a high degree of accuracy. In addition, the present invention permits high-accuracy determination of motion of the 3D object with non-rigid change.

The invention claimed is:

1. An image processing apparatus for estimating a motion of a plurality of predetermined feature points of a 3D object from a motion picture of the 3D object taken by a monocular camera, comprising:

observation vector extracting means for extracting projected coordinates of the predetermined feature point onto an image plane, from each of frames of the motion picture;

3D model initializing means for making the observation vector extracting means extract from an initial frame of the motion picture, initial projected coordinates in a model coordinate arithmetic expression for calculation of model coordinates of the predetermined feature point on the basis of a first parameter, a second parameter, and the initial projected coordinates; and motion estimating means for calculating estimates of state variables including a third parameter in a motion arithmetic expression for calculation of coordinates of the predetermined feature point at a time of photography when a processed target frame of the motion picture different from the initial frame was taken, from the model coordinates, the first parameter, and the second parameter, and for outputting an output value about the motion of the predetermined feature point on the basis of the second parameter included in the estimates of the state variables, wherein the model coordinate arithmetic expression is based on back projection of the monocular camera, the first parameter is a parameter independent of a local motion of a portion including the predetermined feature point, and the second parameter is a parameter dependent on the local motion of the portion including the predetermined feature point, and wherein the motion estimating means:

calculates predicted values of the state variables at the time of photography when the processed target frame was taken, based on a state transition model;

applies the initial projected coordinates, and the first parameter and the second parameter included in the predicted values of the state variables, to the model coordinate arithmetic expression to calculate estimates of the model coordinates at the time of photography;

applies the third parameter in the predicted values of the state variables and the estimates of the model coordinates to the motion arithmetic expression to calculate estimates of coordinates of the predetermined feature point at the time of photography;

applies the estimates of the coordinates of the predetermined feature point to an observation function using a perspective transformation based on an observation model of the monocular camera to calculate estimates of an observation vector of the predetermined feature point;

makes the observation vector extracting means extract the projected coordinates of the predetermined feature point from the processed target frame, as the observation vector; and filters the predicted values of the state variables by use of the extracted observation vector and the estimates of the observation vector to calculate estimates of the state variables at the time of photography, wherein each of the plurality of feature points represent each of a plurality of parts of the 3D object and are used for determining a local motion of each part of the 3D object when each part has different motion.

2. The image processing apparatus according to claim 1, wherein the first parameter is a static parameter to converge at a specific value, and wherein the second parameter is a dynamic parameter to vary with the motion of the portion including the predetermined feature point.

3. The image processing apparatus according to claim 2, wherein the static parameter is a depth from the image plane to the predetermined feature point.

4. The image processing apparatus according to claim 2, wherein the dynamic parameter is a rotation parameter for specifying a rotation motion of the portion including the predetermined feature point.

5. The image processing apparatus according to claim 4, wherein the rotation parameter is an angle made by a vector from an origin to the predetermined feature point, relative to two coordinate axes in a coordinate system whose origin is at a center of the portion including the predetermined feature point.

6. The image processing apparatus according to claim 1, wherein the first parameter is a rigid parameter, and wherein the second parameter is a non-rigid parameter.

7. The image processing apparatus according to claim 6, wherein the rigid parameter is a depth from the image plane to the model coordinates.

8. The image processing apparatus according to claim 6, wherein the non-rigid parameter is a change amount about a position change of the predetermined feature point due to the motion of the portion including the predetermined feature point.

9. The image processing apparatus according to claim 1, wherein the motion model is based on rotation and translation motions of the 3D object, and wherein the third parameter is a translation parameter for specifying a translation amount of the 3D object and a rotation parameter for specifying a rotation amount of the 3D object.

10. The image processing apparatus according to claim 1, wherein the motion estimating means applies extended Kalman filtering as said filtering.

11. The image processing apparatus according to claim 1, wherein a 3D structure of a center of a pupil on a facial picture is defined by a static parameter and a dynamic parameter, and wherein a gaze is determined by estimating the static parameter and the dynamic parameter.

12. The image processing apparatus according to claim 11, wherein the static parameter is a depth of the pupil in a camera coordinate system.

13. The image processing apparatus according to claim 11, wherein the dynamic parameter is a rotation parameter of an eyeball.

14. The image processing apparatus according to claim 13, wherein the rotation parameter of the eyeball has two degrees of freedom to permit rotations with respect to two coordinate axes in an eyeball coordinate system.

15. The image processing apparatus according to claim 1,
wherein a 3D structure of the 3D object on a picture is defined by a rigid parameter and a non-rigid parameter and wherein the motion of the 3D object is determined by estimating the rigid parameter and the non-rigid parameter.

16. The image processing apparatus according to claim 15, wherein the rigid parameter is a depth of a feature point of the 3D object in a model coordinate system.

17. The image processing apparatus according to claim 15, wherein the non-rigid parameter is a change amount of a feature point of the 3D object in a model coordinate system.

* * * * *